US011281346B2

(12) United States Patent
Hirotsugu et al.

(10) Patent No.: US 11,281,346 B2
(45) Date of Patent: Mar. 22, 2022

(54) ELECTRONIC APPARATUS INCLUDING DISPLAY PANEL AND DIGITIZER

(71) Applicant: SAMSUNG DISPLAY CO., LTD., Yongin-si (KR)

(72) Inventors: Kishimoto Hirotsugu, Hwaseong-si (KR); Hyun-Been Hwang, Suwon-si (KR); Cheol Ho Choi, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/922,035

(22) Filed: Jul. 7, 2020

(65) Prior Publication Data

US 2021/0034180 A1 Feb. 4, 2021

(30) Foreign Application Priority Data

Aug. 2, 2019 (KR) .................. 10-2019-0094449
Dec. 19, 2019 (KR) .................. 10-2019-0170341

(51) Int. Cl.
*G06F 3/046* (2006.01)
*G06F 3/044* (2006.01)

(52) U.S. Cl.
CPC ............ *G06F 3/046* (2013.01); *G06F 3/0446* (2019.05); *G06F 2203/04102* (2013.01); *G06F 2203/04106* (2013.01); *G06F 2203/04107* (2013.01)

(58) Field of Classification Search
CPC ............ G06F 3/046; G06F 3/0446; G06F 2203/04102; G06F 2203/04106; G06F 2203/04107
See application file for complete search history.

(56) References Cited

U.S. PATENT DOCUMENTS

| 10,026,721 | B2 | 7/2018 | Kim et al. | |
|---|---|---|---|---|
| 2010/0171891 | A1* | 7/2010 | Kaji | G02F 1/13338 349/12 |
| 2012/0306824 | A1* | 12/2012 | Horie | G06F 3/0445 345/179 |
| 2017/0147115 | A1* | 5/2017 | Ide | G06F 3/0446 |
| 2018/0122863 | A1* | 5/2018 | Bok | H01L 27/3225 |

FOREIGN PATENT DOCUMENTS

| EP | 2148238 | 1/2010 |
|---|---|---|
| EP | 2963094 | 1/2016 |
| JP | 2006-126648 | 5/2006 |
| KR | 10-1510294 | 4/2015 |
| KR | 1020210052699 | 5/2021 |

OTHER PUBLICATIONS

Automatically Analyze and Compare 3D Surfaces, https://www.keyence.com/landing/microscope/pr_vk-x_feature.jsp (last visited Jun. 30, 2020).

* cited by examiner

*Primary Examiner* — Lisa S Landis
(74) *Attorney, Agent, or Firm* — F. Chau & Associates, LLC

(57) ABSTRACT

An electronic apparatus includes a window, a display panel disposed under the window, and a digitizer disposed under the display panel. The digitizer includes a photosensitive resin layer including a front surface and a rear surface opposite to the front surface, and a plurality of sensing coils disposed inside the photosensitive resin layer. The front surface is relatively flat compared with the rear surface.

29 Claims, 18 Drawing Sheets

ELECTRONIC APPARATUS INCLUDING DISPLAY PANEL AND DIGITIZER

CROSS-REFERENCE TO RELATED APPLICATIONS

This application claims priority under 35 U.S.C. § 119 to Korean Patent Application Nos. 10-2019-0094449 filed on Aug. 2, 2019, and 10-2019-0170341 filed on Dec. 19, 2019, the disclosures of which are hereby incorporated by reference in their entireties.

TECHNICAL FIELD

Exemplary embodiments of the present disclosure relate to an electronic apparatus. More particularly, exemplary embodiments of the present disclosure relate to an electronic apparatus having improved reliability.

DISCUSSION OF THE RELATED ART

An electronic apparatus may include a display device such as a liquid crystal display (LCD), a plasma display panel (PDP), an organic light emitting diode (OLED) display, a field effect display (FED), and an electrophoretic display (EPD).

Such an electronic apparatus may be activated in response to electrical signals applied thereto. The electronic apparatus may include a sensor that senses an external input applied thereto from the outside of a display panel displaying an image.

Such an electronic apparatus may include various electrode patterns to be activated by the electrical signals. Areas in which the electrode patterns are activated display information or respond to the external signal.

SUMMARY

Exemplary embodiments of the present disclosure provide an electronic apparatus having an improved visibility.

According to an exemplary embodiment, an electronic apparatus includes a window, a display panel disposed under the window, and a digitizer disposed under the display panel. The digitizer includes a photosensitive resin layer including a first surface and a second surface opposite to the first surface, and a plurality of sensing coils disposed inside the photosensitive resin layer. The first surface is relatively flat compared with the second surface.

In an exemplary embodiment the first surface is disposed more adjacent to the display panel than the second surface is, a surface roughness of the first surface is smaller than a surface roughness of the second surface, and the surface roughness of the first surface is equal to or greater than about 1 micrometer and equal to or smaller than about 10 micrometers.

In an exemplary embodiment, the surface roughness of the second surface is equal to or greater than about 5 micrometers and equal to or smaller than about 15 micrometers.

In an exemplary embodiment, the digitizer further includes a shielding layer disposed on the second surface, and an adhesive layer attaching the shielding layer to the second surface. The shielding layer includes a magnetic metal powder.

In an exemplary embodiment, the second surface is disposed more adjacent to the display panel than the first surface is, a surface roughness of the first surface is smaller than a surface roughness of the second surface, and the surface roughness of the second surface is equal to or greater than about 1 micrometer and equal to or smaller than about 10 micrometers.

In an exemplary embodiment, the surface roughness of the first surface is equal to or greater than about 1 micrometer and equal to or smaller than about 3 micrometers.

In an exemplary embodiment, the digitizer further includes a shielding layer making contact with the first surface, and the shielding layer includes one of a permalloy, an invar, and a stainless steel.

In an exemplary embodiment, the plurality of sensing coils includes a first sensing coil extending in a first direction, and a second sensing coil extending in a second direction crossing the first direction, and spaced apart from the first sensing coil in a thickness direction of the photosensitive resin layer.

In an exemplary embodiment, the photosensitive resin layer includes a first photosensitive resin layer, a second photosensitive resin layer, and a third photosensitive resin layer. The first sensing coil is disposed on the first photosensitive resin layer and the first photosensitive resin layer corresponds to the first surface. The second photosensitive resin layer covers the first sensing coil. The second sensing coil is disposed on the second photosensitive resin layer. The third photosensitive resin layer covers the second sensing coil and corresponds to the second surface.

In an exemplary embodiment, the electronic apparatus further includes at least one of a lower film and a cushion layer disposed under the display panel.

In an exemplary embodiment, the digitizer is disposed at a lowermost position among the display panel, the lower film, and the cushion layer, is disposed between the display panel and the lower film, is disposed between the lower film and the cushion layer, or is disposed between the display panel and the cushion layer.

In an exemplary embodiment, the electronic apparatus further includes at least one of a sensing sensor disposed on the display panel which senses an external input using either self-capacitance or mutual capacitance, and an optical member disposed between the window and the display panel.

In an exemplary embodiment, the electronic apparatus includes a folding area that folds about a folding axis extending in one direction, a first non-folding area extending from a first side of the folding area, and a second non-folding area extending from a second side of the folding area.

In an exemplary embodiment, the photosensitive resin layer includes a photosensitive polyimide.

According to an exemplary embodiment, an electronic apparatus includes a window, a display panel disposed under the window, and a digitizer disposed under the display panel. The digitizer includes a photosensitive resin layer including a front surface and a rear surface opposite to the front surface, and a plurality of sensing coils disposed inside the photosensitive resin layer. A surface roughness of the front surface is equal to or greater than about 1 micrometer and equal to or smaller than about 10 micrometers.

In an exemplary embodiment, a surface roughness of the rear surface is greater than the surface roughness of the front surface, and the surface roughness of the rear surface is equal to or greater than about 5 micrometers and equal to or smaller than about 15 micrometers.

In an exemplary embodiment, the digitizer further includes a shielding layer disposed on the rear surface, and an adhesive layer attaching the shielding layer to the rear surface. The shielding layer includes a magnetic metal powder.

In an exemplary embodiment, a surface roughness of the rear surface is smaller than the surface roughness of the front surface, and the digitizer further includes a shielding layer disposed on the front surface; and the shielding layer comprises one of a permalloy, an invar, and a stainless steel.

In an exemplary embodiment, the plurality of sensing coils includes a first sensing coil extending in a first direction, and a second sensing coil extending in a second direction crossing the first direction, and spaced apart from the first sensing coil in a thickness direction of the photosensitive resin layer.

In an exemplary embodiment, the photosensitive resin layer includes a first photosensitive resin layer, a second photosensitive resin layer, and a third photosensitive resin layer. The first sensing coil is disposed on the first photosensitive resin layer and the first photosensitive resin layer corresponds to the front surface. The second photosensitive resin layer covers the first sensing coil. The second sensing coil is disposed on the second photosensitive resin layer. The third photosensitive resin layer covers the second sensing coil and corresponds to the rear surface.

In an exemplary embodiment, the electronic apparatus further includes at least one of a lower film and a cushion layer disposed under the display panel.

In an exemplary embodiment, the digitizer is disposed between the display panel and the lower film, is disposed between the display panel and the cushion layer, is disposed between the lower film and the cushion layer, or is disposed under one of the display panel, the lower film, and the cushion layer.

According to an exemplary embodiment, an electronic apparatus includes a window, a display panel disposed under the window, and a digitizer disposed under the display panel and including a first surface and a second surface opposite to the first surface. The digitizer includes a first photosensitive resin layer corresponding to the first surface of the digitizer, a first sensing coil disposed on the first photosensitive resin layer, a second photosensitive resin layer covering the first sensing coil, a second sensing coil disposed on the second photosensitive resin layer, and a third photosensitive resin layer covering the second sensing coil and corresponding to the second surface of the digitizer. The first surface is relatively flat compared with the second surface.

In an exemplary embodiment, the first surface is disposed more adjacent to the display panel than the second surface is, and a surface roughness of the first surface is smaller than a surface roughness of the second surface.

In an exemplary embodiment, the surface roughness of the first surface is equal to or greater than about 1 micrometer and equal to or smaller than about 10 micrometers, and the surface roughness of the second surface is equal to or greater than about 5 micrometers and equal to or smaller than about 15 micrometers.

In an exemplary embodiment, the first photosensitive resin layer, the second photosensitive resin layer, and the third photosensitive resin layer include a photosensitive polyimide.

According to the above, the digitizer includes two opposing surfaces when the flat surface is adjacent to the display module, a phenomenon in which the uneven surface is visually recognized by the user due to the light transmitted through the display module that may be prevented or reduced.

And, when the uneven surface is adjacent to the display module, the shielding layer may be coupled to the photosensitive resin layer even though a separate adhesive layer is not provided, and thus, a slim digitizer may be provided.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Figure 1A:
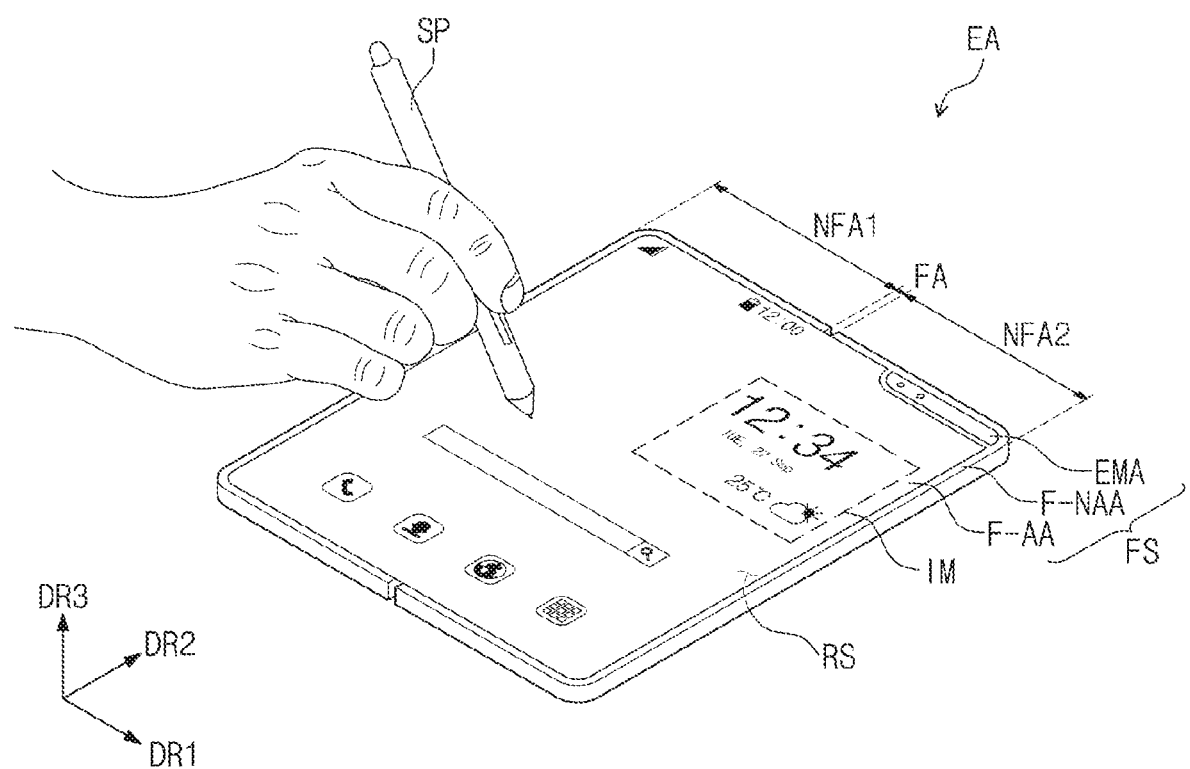
FIG. 1A is a perspective view showing an electronic apparatus in an unfolded state according to an exemplary embodiment of the present disclosure.

Exemplary embodiments of the present disclosure will be described more fully hereinafter with reference to the accompanying drawings. Like reference numerals may refer to like elements throughout the accompanying drawings.

In the present disclosure, it will be understood that when an element or layer is referred to as being "on", "connected to" or "coupled to" another element or layer, it can be directly on, connected or coupled to the other element or layer or intervening elements or layers may be present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof.

It should be understood that descriptions of features or aspects within each exemplary embodiment should typically be considered as available for other similar features or aspects in other exemplary embodiments, unless the context clearly indicates otherwise.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

Figure 1B:
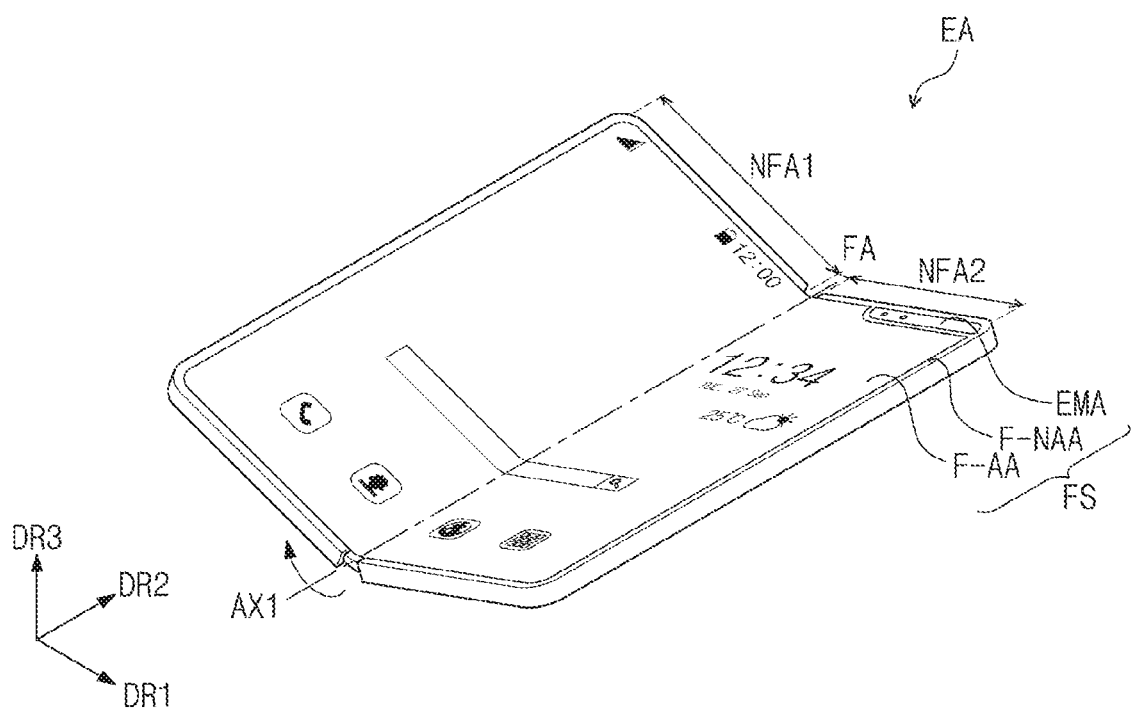
FIG. 1B is a perspective view showing an electronic apparatus according to an exemplary embodiment of the present disclosure.
Figure 1C:
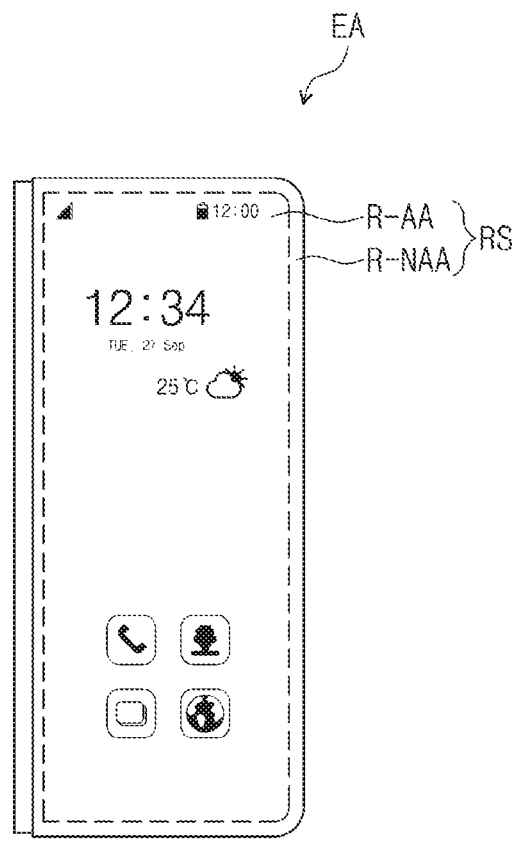
FIG. 1C is a plan view showing an electronic apparatus in a folded state according to an exemplary embodiment of the present disclosure.
Figure 1C:
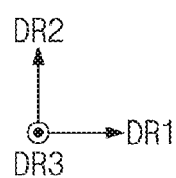
Figure 1D:
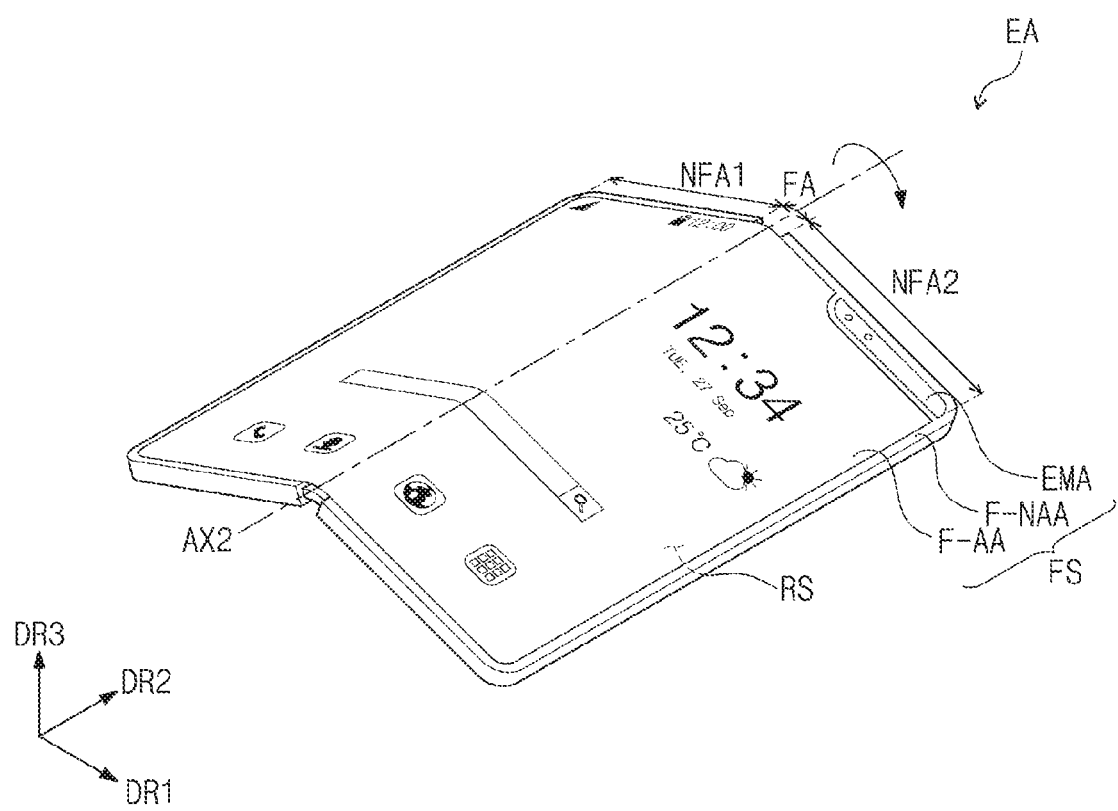
FIG. 1D is a perspective view showing an electronic apparatus according to an exemplary embodiment of the present disclosure.

FIG. 1A is a perspective view showing an electronic apparatus EA in an unfolded state according to an exemplary embodiment of the present disclosure. FIG. 1B is a perspective view showing the electronic apparatus EA according to an exemplary embodiment of the present disclosure. FIG. 1C is a plan view showing the electronic apparatus EA in a folded state according to an exemplary embodiment of the present disclosure. FIG. 1D is a perspective view showing the electronic apparatus EA according to an exemplary embodiment of the present disclosure.

Referring to FIG. 1A, the electronic apparatus EA may be an apparatus activated in response to an electrical signal. According to exemplary embodiments, the electronic apparatus EA may include a tablet computer, a notebook computer, a computer, or a smart television. In the exemplary embodiment described herein, a smartphone will be described as the electronic apparatus EA. However, the present disclosure is not limited thereto.

The electronic apparatus EA may display an image IM through a first display surface FS. The first display surface FS through which the image IM is displayed may correspond to a front surface of the electronic apparatus EA. The image IM may include, for example, a motion image (e.g., for use in a video) and a still image. FIG. 1A shows a time, date and weather widget as an example of the image IM.

In an exemplary embodiment, front (or upper) and rear (or lower) surfaces of each member of the electronic apparatus EA may be defined with respect to a direction in which the image IM is displayed. The front and rear surfaces may face each other in a third direction DR3, and a normal line direction of each of the front and rear surfaces may be substantially parallel to the third direction DR3.

A distance between the front surface and the rear surface in the third direction DR3 may correspond to a thickness or a height of the electronic apparatus EA in the third direction DR3. Directions indicated by the first, second, and third directions DR1, DR2, and DR3 may be relative to one another and may be changed to other directions.

The electronic apparatus EA may sense an external input applied thereto from an outside. The external input may include various forms of inputs provided from the outside of the electronic apparatus EA.

For example, the external inputs may include a proximity input (e.g., hovering) applied when approaching close to or adjacent to the electronic apparatus EA at a predetermined distance, as well as a touch input by a user's body (e.g., user's hand). In addition, the external inputs may be provided in the form of force, pressure, temperature, light, etc.

FIG. 1A shows an example of the external inputs caused by a pen SP. The pen SP may be attached to or detached from the electronic apparatus EA, and the electronic apparatus EA may provide or receive signals corresponding to the attachment and detachment of the pen SP.

The electronic apparatus EA according to an exemplary embodiment may include the first display surface FS and a second display surface RS. The first display surface FS may also be referred to as a front display surface, and the second display surface RS may also be referred to as a rear display surface. The first display surface FS may include a first active area F-AA, a first peripheral area F-NAA, and an electronic module area EMA. The second display surface RS may be opposite to the first display surface FS.

The first active area F-AA may be activated in response to the electrical signal. The image may be displayed through the first active area F-AA, and various external inputs may be sensed through the first active area F-AA. The first peripheral area F-NAA may be adjacent to the first active area F-AA. The first peripheral area F-NAA may have a predetermined color. The first peripheral area F-NAA may also be referred to as a bezel area. The first peripheral area F-NAA may surround the first active area F-AA. Accordingly, the first active area F-AA may be substantially defined by the first peripheral area F-NAA, however, this is merely exemplary. For example, in exemplary embodiments, the first peripheral area F-NAA may be adjacent to only one side of the first active area F-AA, may be adjacent to more than one side, but less than all sides of the first active area F-AA, or may be omitted. However, the electronic apparatus EA is not limited to only these configurations.

Various electronic modules may be disposed in the electronic module area EMA. For example, such an electronic module may include at least one of a camera, a speaker, a light sensing sensor, and a heat sensing sensor. The electronic module area EMA may sense an external subject through the display surfaces FS and RS, or may provide a sound signal, such as a voice, to the outside through the display surfaces FS and RS. In addition, the electronic module may include a plurality of other components, and is not limited to the components described herein.

The electronic module area EMA may be surrounded by one of the first active area F-AA and the first peripheral area F-NAA. However, the electronic module area EMA is not limited thereto. For example, the electronic module area EMA may be defined in the first active area F-AA, but is not particularly limited.

The electronic apparatus EA according to an exemplary embodiment may include at least one folding area FA and a plurality of non-folding areas NFA1 and NFA2 extending from the folding area FA.

Referring to FIG. 1B, the electronic apparatus EA may include a first folding axis AX1 that extends in the second direction DR2. For example, the first folding axis AX1 may extend in the second direction DR2 on the first display surface FS. The first folding axis AX1 may be referred to as an imaginary axis about which the electronic apparatus EA is in-folded. In an exemplary, the non-folding areas NFA1 and NFA2 may extend from the folding area FA with the folding area FA interposed therebetween along the first folding axis AX1. For example, a first non-folding area NFA1 may extend from one side of the folding area FA in the first direction DR1, and a second non-folding area NFA2 may extend from the other side of the folding area FA in the first direction DR1.

The electronic apparatus EA may be folded about the first folding axis AX1 to be in an in-folding state in which one area of the first display surface FS, which overlaps the first non-folding area NFA1, faces the other area of the first display surface FS, which overlaps the second non-folding area NFA2. For example, in the in-folding state, the first display surface FS may be folded into itself and the second display surface RS may be exposed to the outside.

Referring to FIG. 1C, the second display surface RS may be viewed by a user during the in-folding state of the electronic apparatus EA. In this case, the second display surface RS may include a second active area R-AA through which the image is displayed. The second active area R-AA may be activated in response to electrical signals. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may also be referred to as a bezel area. The second peripheral area R-NAA may surround the second active area R-AA. In addition, the second display surface RS may further include an electronic module area in which an electronic module including various components is disposed, similar to as described above. However, the second display surface RS is not limited thereto.

Referring to FIG. 1D, the electronic apparatus EA may include a second folding axis AX2 that extends in the second direction DR2. For example, the second folding axis AX2 may extend in the second direction DR2 on the second display surface RS. The second folding axis AX2 may be referred to as an imaginary axis about which the electronic apparatus EA is out-folded.

The electronic apparatus EA may be folded about the second folding axis AX2 to be in an out-folding state in which one area of the second display surface RS, which overlaps the first non-folding area NFA1, faces the other area of the second display surface RS, which overlaps the second non-folding area NFA2. For example, in the out-folding state, the second display surface RS may be folded into itself and the first display surface FS may be exposed to the outside.

It is to be understood that the electronic apparatus EA is not limited to the configuration described above. For example, in exemplary embodiments, the electronic apparatus EA may be folded about a plurality of folding axes such that a portion of the first display surface FS and a portion of the second display surface RS face each other, and the number of the folding axes and the number of non-folding areas are not limited to the configuration described above.

Figure 2A:
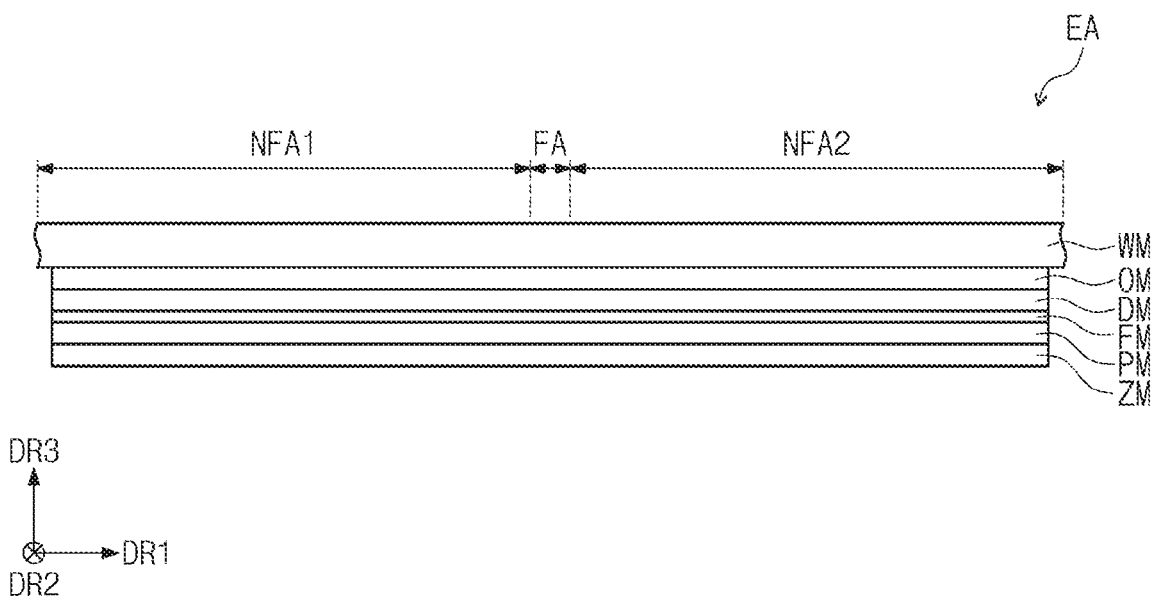
FIG. 2A is a cross-sectional view showing an electronic apparatus according to an exemplary embodiment of the present disclosure.
Figure 2B:
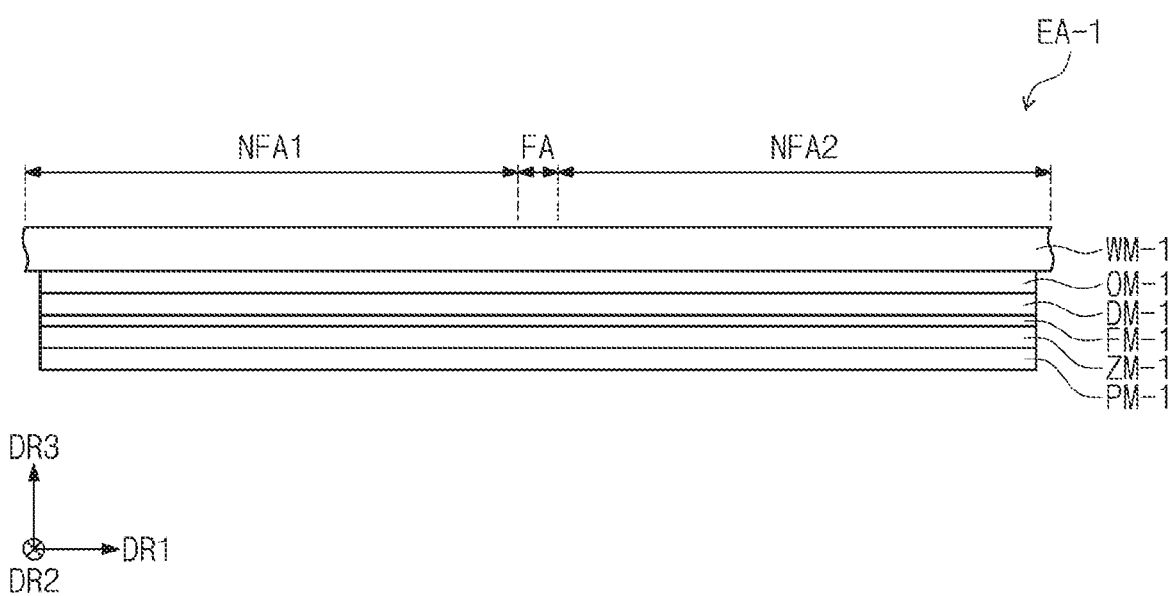
FIG. 2B is a cross-sectional view showing an electronic apparatus according to an exemplary embodiment of the present disclosure.
Figure 2C:
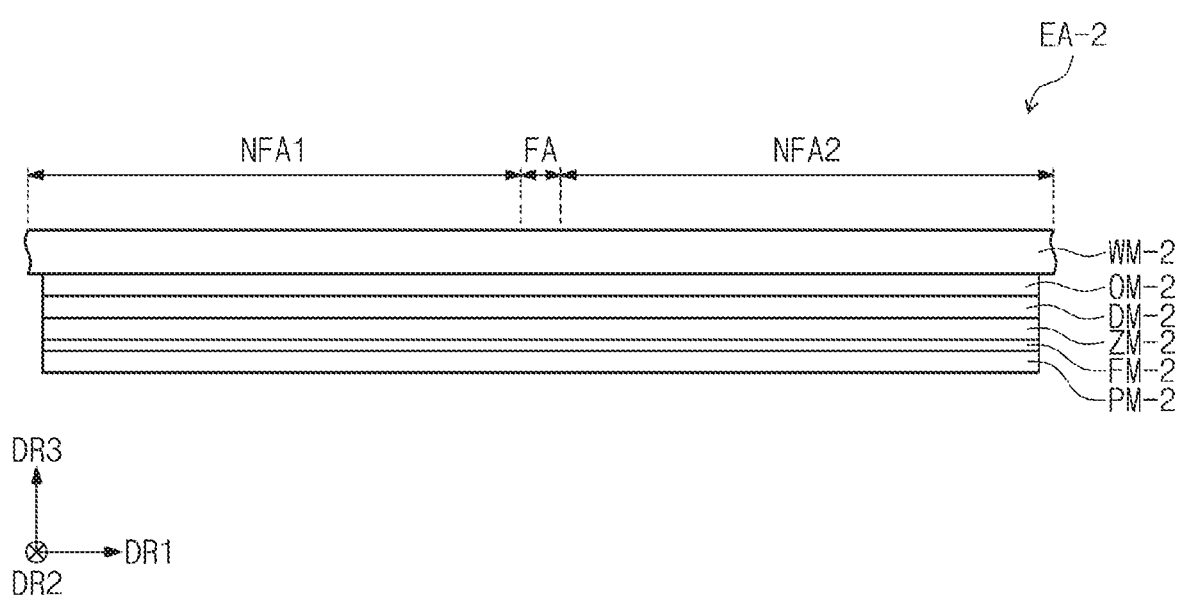
FIG. 2C is a cross-sectional view showing an electronic apparatus according to an exemplary embodiment of the present disclosure.
Figure 3A:
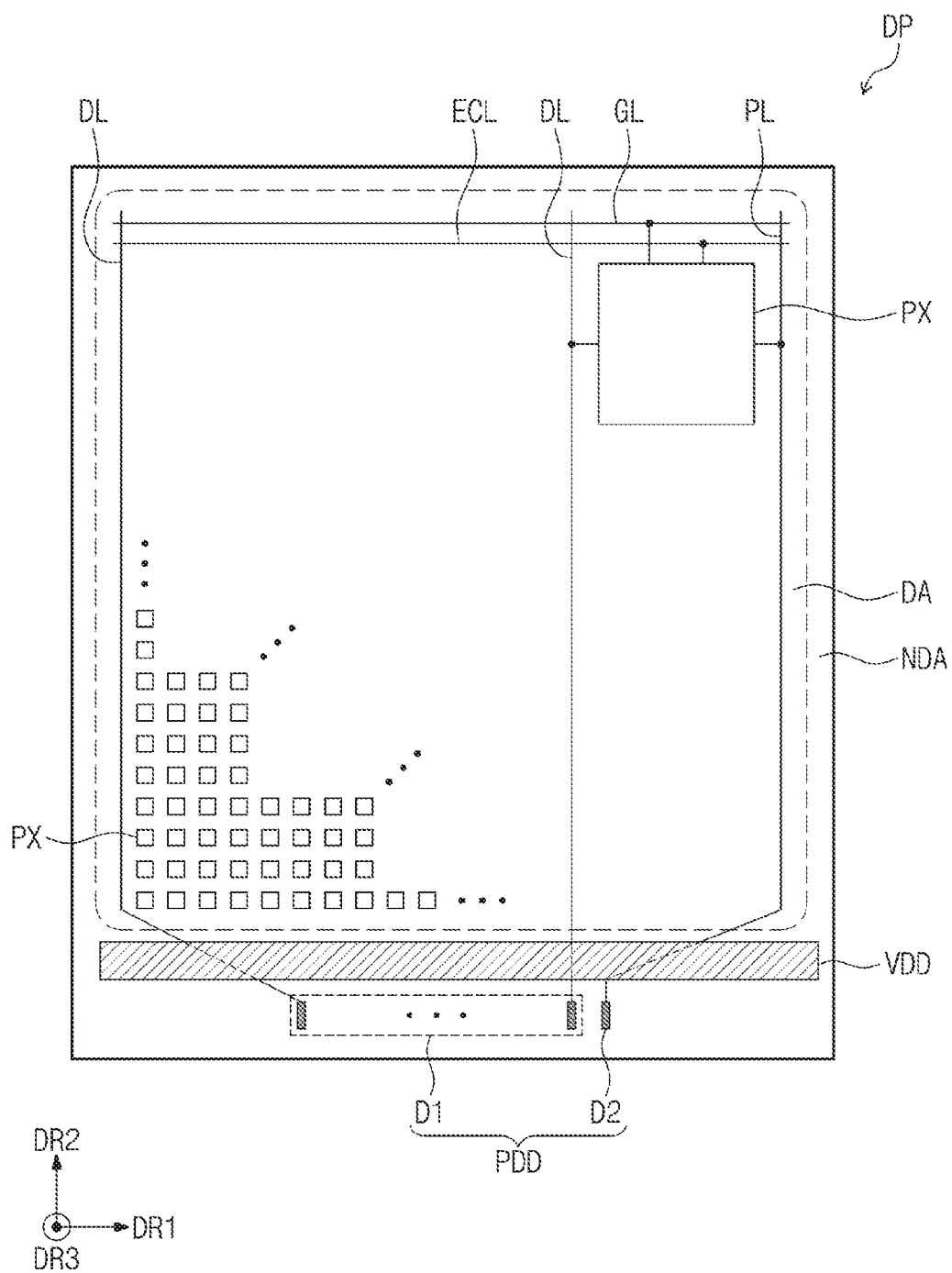
FIG. 3A is a plan view showing a display panel according to an exemplary embodiment of the present disclosure.
Figure 3B:
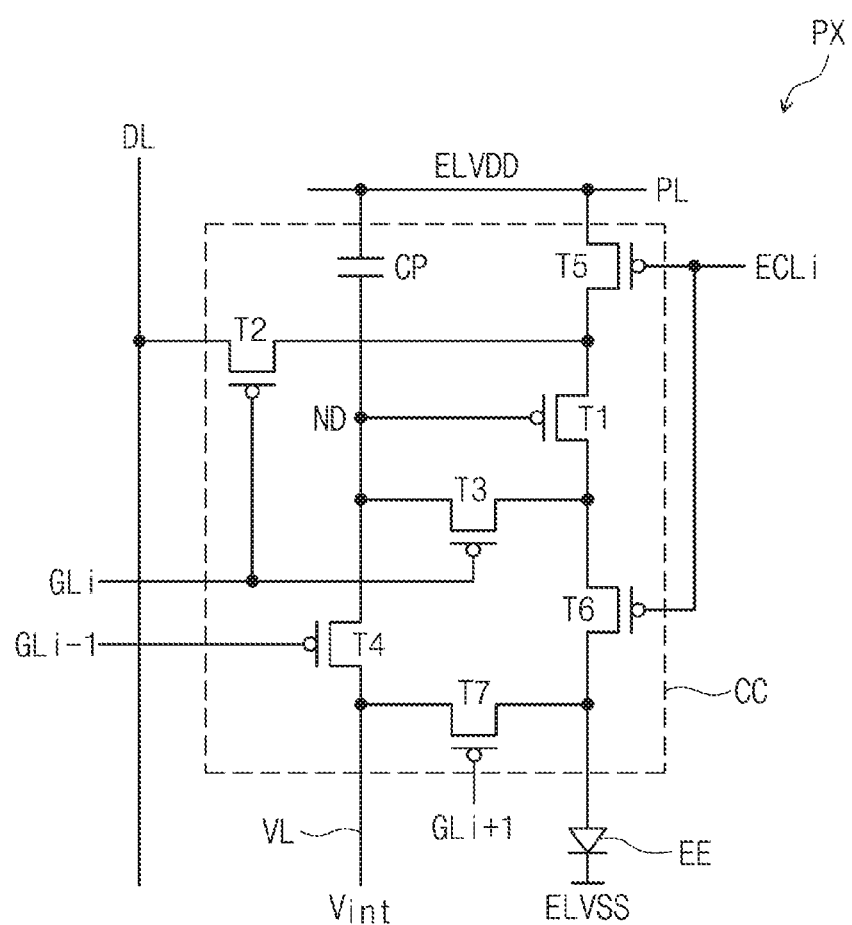
FIG. 3B is an equivalent circuit diagram showing a pixel according to an exemplary embodiment of the present disclosure.
Figure 4:
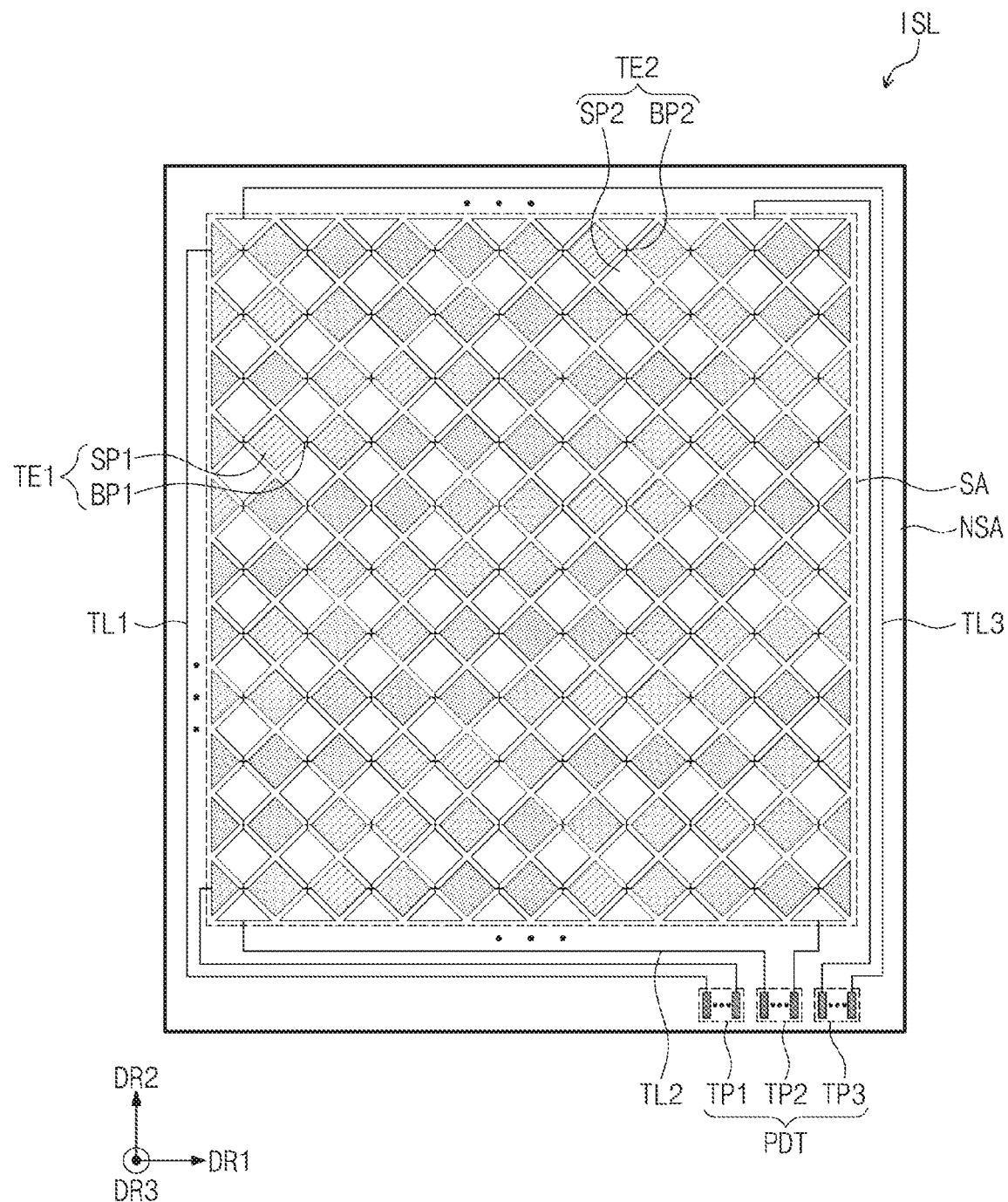
FIG. 4 is a plan view showing a sensing sensor according to an exemplary embodiment of the present disclosure.

FIG. 2A is a cross-sectional view showing an electronic apparatus EA according to an exemplary embodiment of the present disclosure. FIG. 2B is a cross-sectional view showing an electronic apparatus EA-1 according to an exemplary embodiment of the present disclosure. FIG. 2C is a cross-sectional view showing an electronic apparatus EA-2 according to an exemplary embodiment of the present disclosure. FIG. 3A is a plan view showing a display panel DP according to an exemplary embodiment of the present disclosure. FIG. 3B is an equivalent circuit diagram showing a pixel PX according to an exemplary embodiment of the present disclosure. FIG. 4 is a plan view showing a sensing sensor ISL according to an exemplary embodiment of the present disclosure.

In FIGS. 2A to 2C, 3A and 3B, and 4, the same/similar reference numerals denote the same/similar elements in FIGS. 1A to 1D. Thus, for convenience of explanation, a further detailed description thereof will be omitted.

FIGS. 2A to 2C are cross-sectional views schematically showing the electronic apparatuses EA, EA-1, and EA-2 according to exemplary embodiments of the present disclosure.

Referring to FIG. 2A, the electronic apparatus EA may include a window WM, an optical member OM, a display module DM, a lower film FM, a protective member PM, and a digitizer ZM.

The window WM may be disposed on the display module DM. The window WM may provide the display surfaces FS and RS and may protect the display module DM. The window WM may include a material having a high light transmittance. For example, the window WM may include a glass substrate, a sapphire substrate, or a plastic film. The window WM may have a single-layer or multi-layer structure. For example, the window WM may have a stack structure of a plurality of plastic films attached to one another by an adhesive, or a stack structure of the glass substrate and the plastic film attached to the glass substrate by an adhesive.

In the window WM, one area through which a light generated by the display module DM transmits may be defined as the first active area F-AA of the first display surface FS, and a bezel area of the window WM may be defined as the first peripheral area F-NAA. In addition, the other area through which the light generated by the display module DM transmits in the window WM may be defined as the second active area R-AA of the second display surface RS, and the bezel area of the window WM may be defined as the second peripheral area R-NAA.

The optical member OM may be disposed under the window WM. The optical member OM may reduce an external light reflectance of the display module DM with respect to the light incident to the display module DM. For example, the optical member OM may include at least one of an anti-reflective film, a polarizing film, a color filter, and a gray filter.

The display module DM may serve as an output device. For example, the display module DM may display the image through the active areas F-AA and R-AA, and the user may acquire information through the image. In addition, the display module DM may serve as an input device to sense the external input applied to the active areas F-AA and R-AA.

The display module DM may include the display panel DP and the sensing sensor ISL.

Referring to FIG. 3A, the display panel DP may include a plurality of pixels PX, a plurality of signal lines GL, DL, PL, and ECL, and a plurality of display pads PDD.

The display panel DP may include a display area DA through which the image is displayed, and a non-display area NDA in which a driving circuit or a driving line is disposed and in which the image is not displayed. The display area DA may overlap at least a portion of the active areas F-AA and R-AA of the electronic apparatus EA. In addition, the non-display area NDA may overlap the peripheral areas F-NAA and R-NAA of the electronic apparatus EA.

The signal lines GL, DL, PL, and ECL may be connected to the pixels PX to apply electrical signals to the pixels PX. Among the signal lines included in the display panel DP, a scan line GL, a data line DL, a power line PL, and a light emitting control line ECL are shown as a representative example. However, this is merely exemplary. For example, the signal lines GL, DL, PL, and ECL may further include an initialization voltage line, and the signal lines GL, DL, PL, and ECL are not particularly limited. The pixels PX may be arranged in the first direction DR1 and the second direction DR2 to form a matrix configuration in a plan view.

FIG. 3B shows an exemplary embodiment of a signal circuit diagram of one pixel PX among the pixels PX. FIG. 3B shows the pixel PX connected to an i-th scan line GLi and an i-th light emitting control line ECLi, in which i is a natural number.

The pixel PX may include a light emitting element EE and a pixel circuit CC. The pixel circuit CC may include a plurality of transistors T1 to T7 and a capacitor CP. The transistors T1 to T7 may be formed through, for example, a low temperature polycrystalline silicon (LTPS) process or a low temperature polycrystalline oxide (LTPO) process.

The pixel circuit CC may control an amount of current flowing through the light emitting element EE in response to a data signal. The light emitting element EE may emit a light at a predetermined luminance in response to the amount of the current provided from the pixel circuit CC. To this end, a first power voltage ELVDD has a voltage level set higher than a voltage level of a second power voltage ELVSS. The light emitting element EE may include, for example, an organic light emitting element or a quantum dot light emitting element.

Each of the transistors T1 to T7 may include an input electrode (or source electrode), an output electrode (or drain electrode), and a control electrode (or gate electrode). In the present disclosure, for the convenience of explanation, one electrode of the input electrode and the output electrode may be referred to as a "first electrode," and the other electrode of the input electrode and the output electrode may be referred to as a "second electrode."

A first electrode of a first transistor T1 is connected to the first power voltage ELVDD via a fifth transistor T5, and a second electrode of the first transistor T1 is connected to an anode electrode of the light emitting element EE via a sixth transistor T6. The first transistor T1 may be referred to as a "driving transistor."

The first transistor T1 controls the amount of the current flowing through the light emitting element EE in response to a voltage applied to a control electrode of the first transistor T1.

A second transistor T2 is connected between the data line DL and the first electrode of the first transistor T1. A control electrode of the second transistor T2 is connected to the i-th scan line GLi. When an i-th scan signal is applied to the i-th scan line GLi, the second transistor T2 is turned on to electrically connect the data line DL to the first electrode of the first transistor T1.

A third transistor T3 is connected between the second electrode of the first transistor T1 and the control electrode of the first transistor T1. A control electrode of the third transistor T3 is connected to the i-th scan line GLi. When the i-th scan signal is applied to the i-th scan line GLi, the third transistor T3 is turned on to electrically connect the second electrode of the first transistor T1 to the control electrode of the first transistor T1. Accordingly, when the third transistor T3 is turned on, the first transistor T1 is connected in a diode configuration.

A fourth transistor T4 is connected between a node ND and an initialization power generator. A control electrode of the fourth transistor T4 is connected to an (i−1)th scan line GLi−1. When an (i−1)th scan signal is applied to the (i−1)th scan line GLi−1, the fourth transistor T4 is turned on to apply an initialization voltage Vint to the node ND.

The fifth transistor T5 is connected between the power line PL and the first electrode of the first transistor T1. A control electrode of the fifth transistor T5 is connected to the i-th light emitting control line ECLi.

The sixth transistor T6 is connected between the second electrode of the first transistor T1 and the anode electrode of the light emitting element EE. A control electrode of the sixth transistor T6 is connected to the i-th light emitting control line ECLi.

A seventh transistor T7 is connected between the initialization power generator and the anode electrode of the light emitting element EE. A control electrode of the seventh transistor T7 is connected to an (i+1)th scan line GLi+1. When an (i+1)th scan signal is applied to the (i+1)th scan line GLi+1, the seventh transistor T7 is turned on to apply the initialization voltage Vint to the anode electrode of the light emitting element EE.

The seventh transistor T7 may improve a black expression capability of the pixel PX. For example, when the seventh transistor T7 is turned on, a parasitic capacitor of the light emitting element EE is discharged. Then, in an exemplary embodiment, the light emitting element EE does not emit the light due to a leakage current from the first transistor T1 when black brightness is displayed, and thus, the black expression capability may be improved.

Additionally, the control electrode of the seventh transistor T7 is connected to the (i+1)th scan line GLi+1 in FIG. 3B. However, the present disclosure is not limited thereto. For example, according to an exemplary embodiment of the present disclosure, the control electrode of the seventh transistor T7 may be connected to the i-th scan line GLi or the (i−1)th scan line GLi−1.

The capacitor CP is connected between the power line PL and the node ND. The capacitor CP is charged with a voltage corresponding to the data signal. When the fifth transistor T5 and the sixth transistor T6 are turned on by the voltage charged in the capacitor CP, the amount of the current flowing through the first transistor T1 may be determined.

In the present disclosure, an equivalent circuit of the pixel PX is not limited to the equivalent circuit shown in FIG. 3B. For example, according to exemplary embodiments, the pixel PX may be implemented in various ways to allow the light emitting element EE to emit the light. FIG. 3B shows PMOS transistors used in the pixel circuit CC. However, the present disclosure is not limited thereto. For example, in exemplary embodiments, the pixel circuit CC may be implemented using NMOS transistors, or a combination of NMOS and PMOS transistors.

Referring again to FIG. 3A, a power pattern VDD may be disposed in the non-display area NDA. In an exemplary embodiment, the power pattern VDD may be connected to the power lines PL. Accordingly, the display panel DP may include the power pattern VDD, and thus, the pixels PX may receive the same first power supply signal.

The display pads PDD may include a first pad D1 and a second pad D2. The first pad D1 may be provided as a plurality, and the first pads D1 may be respectively connected to the data lines DL. The second pad D2 may be connected to the power pattern VDD to be electrically connected to the power line PL. The display panel DP may apply the electrical signals, which are provided from the outside through the display pads PDD, to the pixels PX. The display pads PDD may further include pads to receive other electrical signals in addition to the first and second pads D1 and D2, and the display pads PDD are not limited to a particular exemplary embodiment.

Referring to FIG. 4, the sensing sensor ISL may be disposed on the display panel DP. The sensing sensor ISL may be coupled to the display panel DP by a separate adhesive layer. In addition, the sensing sensor ISL may be formed directly on the display panel DP through successive processes. However, the sensing sensor ISL is not particularly limited.

The sensing sensor ISL may include a first sensing electrode TE1, a second sensing electrode TE2, a plurality of sensing lines TL1, TL2, and TL3, and a plurality of sensing pads PDT including first to third sensing pads TP1, TP2, and TP3. The sensing sensor ISL may include a sensing area SA and a non-sensing area NSA. The non-sensing area NSA may surround the sensing area SA. The sensing area SA may be a sensing area in which the input provided from the outside is sensed. The sensing area SA may overlap the display area DA of the display panel DP.

The sensing sensor ISL may sense the external input using, for example, a self-capacitance method or a mutual capacitance method. The first sensing electrode TE1 and the second sensing electrode TE2 may be variously modified, arranged, and connected according to the self-capacitance method or the mutual capacitance method.

The first sensing electrode TE1 may include first sensing patterns SP1 and first connection patterns BP1. The first sensing electrode TE1 may extend in the first direction DR1 and may be arranged in the second direction DR2. The first sensing patterns SP1 may be spaced apart from each other in the first direction DR1. At least one first connection pattern BP1 may be connected to two first sensing patterns SP1 adjacent to each other in the first direction DR1, thus connecting the two adjacent first sensing patterns SP1 to each other in the first direction DR1.

The second sensing electrode TE2 may include second sensing patterns SP2 and second connection patterns BP2. The second sensing electrode TE2 may extend in the second direction DR2 and may be arranged in the first direction DR1. The second sensing patterns SP2 may be spaced apart from each other in the second direction DR2. At least one second connection pattern BP2 may be connected to two second sensing patterns SP2 adjacent to each other in the second direction DR2, thus connecting the two adjacent second sensing patterns SP2 to each other in the second direction DR2.

The sensing lines TL1, TL2, and TL3 may be arranged in the non-sensing area NSA. The sensing lines TL1, TL2, and TL3 may include a first sensing line TL1, a second sensing line TL2, and a third sensing line TL3.

The first sensing line TL1 may be connected to the first sensing electrode TE1. The second sensing line TL2 may be connected to one end of the second sensing electrode TE2. The third sensing line TL3 may be connected to the other end of the second sensing electrode TE2. The other end of the second sensing electrode TE2 may be opposite to the one end of the second sensing electrode TE2.

According to an exemplary embodiment, the second sensing electrode TE2 may be connected to the second sensing line TL2 and the third sensing line TL3. Accordingly, a sensitivity with respect to areas of the second sensing electrode TE2 having a relatively longer length than that of the first sensing electrode TE1 may be uniformly maintained. However, this is merely exemplary. In an exemplary embodiment, the third sensing line TL3 may be omitted, and the third sensing line TL3 is not particularly limited.

The sensing pads TP1, TP2, and TP3 may be arranged in the non-sensing area NSA. The sensing pads TP1, TP2, and TP3 may include a first sensing pad TP1, a second sensing pad TP2, and a third sensing pad TP3. The first sensing pad TP1 may be connected to the first sensing line TL1, and thus may be electrically connected to the first sensing electrode TE1. The second sensing pad TP2 may be connected to the second sensing line TL2, and the third sensing pad TP3 may be connected to the third sensing line TL3. Therefore, the second sensing pad TP2 and the third sensing pad TP3 may be electrically connected to the second sensing electrode TE2.

Referring again to FIG. 2A, the lower film FM may be disposed under the display module DM. The lower film FM may reduce a stress applied to the display module DM when the electronic apparatus EA is folded. In addition, the lower film FM may prevent external moisture from entering the display module DM and may absorb external impacts, thereby providing protection to the display module DM.

The lower film FM may include a plastic film as its base layer. For example, the lower film FM may include a plastic film including at least one of polyethersulfone (PES), polyacrylate, polyetherimide (PEI), polyethylene naphthalate (PEN), polyethylene terephthalate (PET), polyphenylene sulfide (PPS), polyarylate, polyimide (PI), polycarbonate (PC), poly(arylene ether sulfone), and combinations thereof.

The material for the lower film FM is not limited to plastic resins, and may include, for example, an organic-inorganic composite material. For example, the lower film FM may include a porous organic layer and an inorganic material filled in pores of the organic layer.

The lower film FM may further include a functional layer formed on the plastic film. The functional layer may include a resin layer. The functional layer may be formed by a coating method.

The protective member PM may be disposed under the lower film FM. The protective member PM may include at least one functional layer that protects the display module DM. For example, the protective member PM may include a light shielding layer, a heat dissipating layer, a cushion layer, and a plurality of adhesive layers.

The light shielding layer may improve a phenomenon in which components disposed in the display module DM are viewed through the window WM through the active areas F-AA and R-AA. The light shielding layer may include a binder and a plurality of pigment particles dispersed in the binder. The pigment particles may include a carbon black. As the electronic apparatus EA according to an exemplary embodiment includes the protective member PM including the light shielding layer, a light shielding effect may be improved.

The heat dissipating layer may effectively dissipate heat generated by the display module DM. The heat dissipating layer may include at least one of, for example, graphite, copper (Cu), and aluminum (Al) having excellent heat dissipation characteristics. However, the heat dissipating layer is not limited thereto. The heat dissipating layer may improve the heat dissipation characteristics and may have electromagnetic wave shielding characteristics or electromagnetic wave absorption characteristics.

The cushion layer may be a synthetic resin foam. The cushion layer may include a matrix and a plurality of pores. The cushion layer may have an elasticity and may have a porous structure.

The matrix may include a flexible material. The matrix may include a synthetic resin. For example, the matrix may include at least one of acrylonitrile butadiene styrene copolymer (ABS), polyurethane (PU), polyethylene (PE), ethylene vinyl acetate (EVA), and polyvinyl chloride (PVC).

The pores may absorb impacts applied to the cushion layer. The pores may be defined by the porous structure of the cushion layer.

However, the present disclosure is not limited thereto. In exemplary embodiments, at least one of the light shielding layer, the heat dissipating layer, and the cushion layer may be omitted and the plural layers may be provided in a single-layer structure. However, the present disclosure is not particularly limited.

The digitizer ZM may be disposed under the display module DM. The digitizer ZM may sense the signal transmitted by the pen SP (refer to FIG. 1A) among the external inputs. The digitizer ZM may sense the external inputs by an electromagnetic resonance (EMR) method. According to the EMR method, a resonant circuit provided in the pen SP generates an electric field, the vibrating electric field induces signals to a plurality of coils included in the digitizer ZM, and a position of the pen SP is detected based on the signals induced to the coils. The digitizer ZM will be described in further detail later.

In an exemplary embodiment, the digitizer ZM, the protective member PM, the lower film FM, the display module DM, and the optical member OM may be sequentially arranged in the third direction DR3 in the electronic apparatus EA. Thus, the digitizer ZM according to an exemplary embodiment may be disposed under the protective member PM, which is disposed at a lowermost position among the display module DM, the lower film FM, and the protective member PM.

The components shown in FIGS. 2A to 2C may be coupled to one another by adhesive layers disposed between the components. The adhesive layers may be, for example, an optically clear adhesive (OCA) film, an optically clear resin (OCR), or a pressure sensitive adhesive (PSA) film. In addition, the adhesive layers may include a light-curable adhesive material or a heat-curable adhesive material. However, the adhesive layers are not particularly limited.

Referring to FIG. 2B, the electronic apparatus EA-1 may include a window WM-1, an optical member OM-1, a display module DM-1, a lower film FM-1, a protective member PM-1, and a digitizer ZM-1.

In an exemplary embodiment, the protective member PM-1, the digitizer ZM-1, the lower film FM-1, the display module DM-1, and the optical member OM-1 of the electronic apparatus EA-1 may be sequentially arranged in the third direction DR3. Accordingly, in an exemplary embodiment, the digitizer ZM-1 may be disposed between the lower film FM-1 and the protective member PM-1.

Referring to FIG. 2C, the electronic apparatus EA-2 may include a window WM-2, an optical member OM-2, a display module DM-2, a lower film FM-2, a protective member PM-2, and a digitizer ZM-2.

In an exemplary embodiment, the protective member PM-2, the lower film FM-2, the digitizer ZM-2, the display module DM-2, and the optical member OM-2 of the electronic apparatus EA-2 may be sequentially arranged in the third direction DR3. Accordingly, in an exemplary embodiment, the digitizer ZM-2 may be disposed between the display module DM-2 and the lower film FM-2.

In an exemplary embodiment, an electronic apparatus may include a lower film, a protective member, a digitizer, a display module, and an optical member, which are sequentially arranged in the third direction DR3, and in this case, the digitizer may be disposed between the display module and the protective member. As another example, the digitizer may be disposed on the display module. However, the location of the digitizer is not particularly limited.

Figure 5:
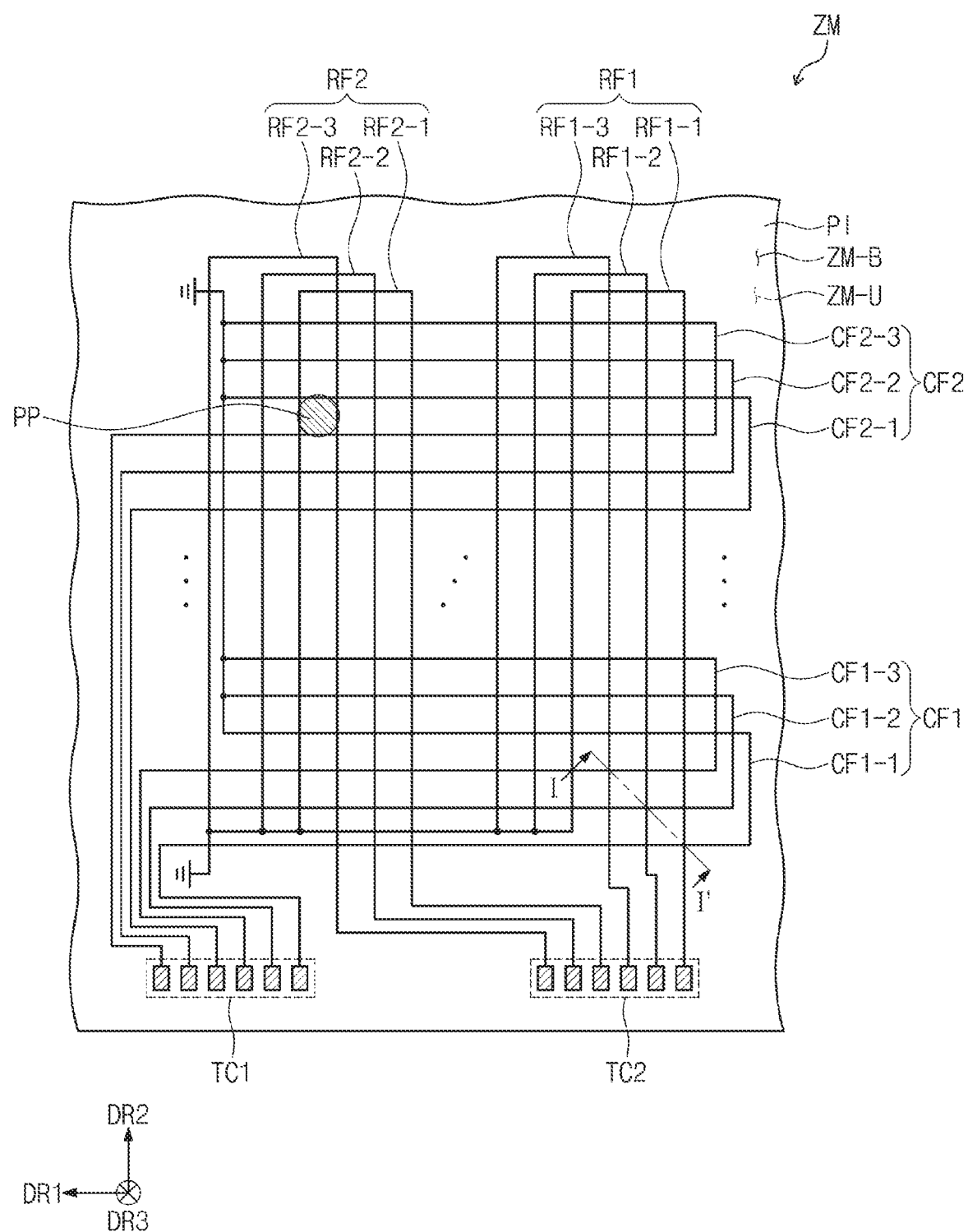
FIG. 5 is a plan view showing a digitizer according to an exemplary embodiment of the present disclosure.
Figure 6A:
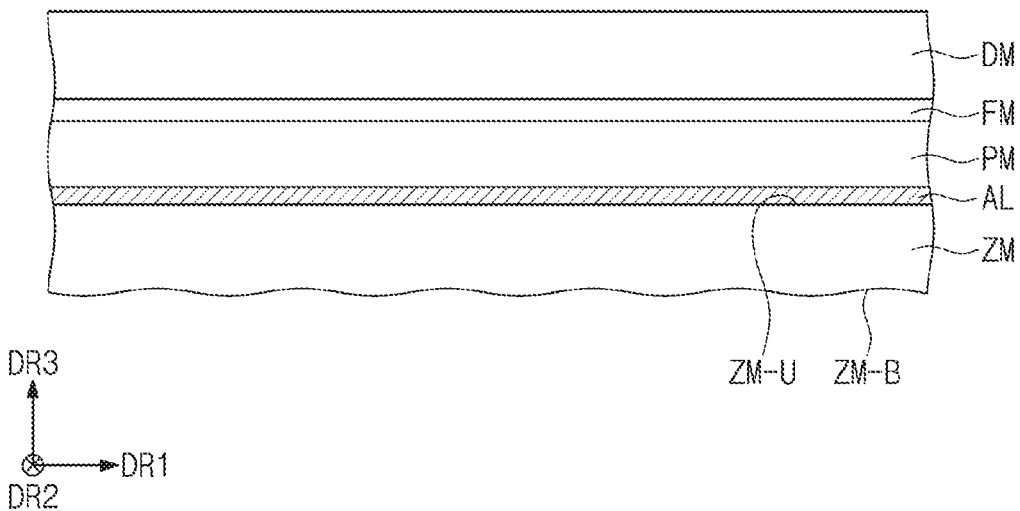
FIG. 6A is a cross-sectional view showing a portion of an electronic apparatus according to an exemplary embodiment of the present disclosure.
Figure 6B:
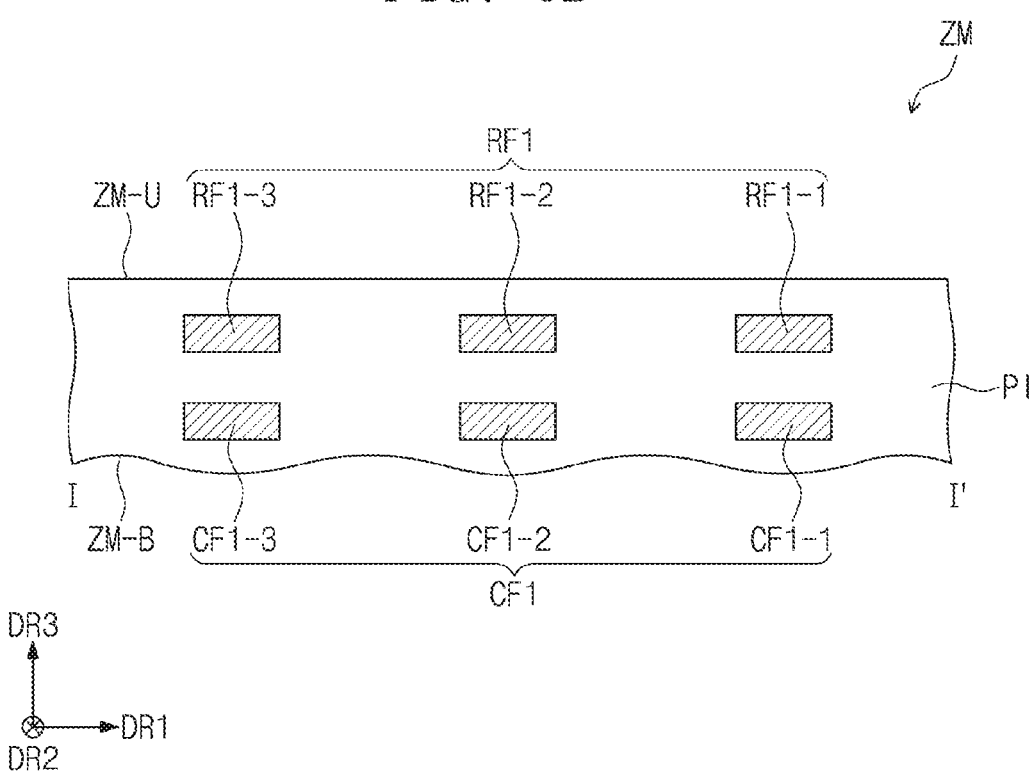
FIG. 6B is a cross-sectional view showing a digitizer according to an exemplary embodiment of the present disclosure.

FIG. 5 is a plan view showing the digitizer ZM according to an exemplary embodiment of the present disclosure. FIG. 6A is a cross-sectional view showing a portion of an electronic apparatus according to an exemplary embodiment of the present disclosure. FIG. 6B is a cross-sectional view showing the digitizer ZM according to an exemplary embodiment of the present disclosure.

The digitizer ZM according to an exemplary embodiment may sense the external input using the electromagnetic resonance (EMR) method.

The digitizer ZM may include a photosensitive resin layer PI, digitizer sensors RF1, RF2, CF1, and CF2, and a plurality of digitizer pads TC1 and TC2. In addition, the digitizer ZM may include a first surface ZM-U and a second surface ZM-B facing the first surface ZM-U. The first surface ZM-U may also be referred to as an upper surface, and the second surface ZM-B may also be referred to as a bottom or rear surface.

The photosensitive resin layer PI may be a base layer on which the digitizer sensors RF1, RF2, CF1, and CF2 are disposed. The photosensitive resin layer PI may include an organic material. For example, the photosensitive resin layer PI may include a photosensitive polyimide.

The digitizer sensors RF1, RF2, CF1, and CF2 may be disposed inside the photosensitive resin layer PI. In the present disclosure, the expression "disposed inside" may mean "embedded." Accordingly, the digitizer sensors RF1, RF2, CF1, and CF2 may be embedded in the photosensitive resin layer PI.

First digitizer sensors RF1 and RF2 may include a plurality of first sensing coils RF1-1, RF1-2, RF1-3, RF2-1, RF2-2, and RF2-3, and second digitizer sensors CF1 and CF2 may include a plurality of second sensing coils CF1-1, CF1-2, CF1-3, CF2-1, CF2-2, and CF2-3.

The first sensing coils RF1-1, RF1-2, RF1-3, RF2-1, RF2-2, and RF2-3 may extend in the first direction DR1. The second sensing coils CF1-1, CF1-2, CF1-3, CF2-1, CF2-2, and CF2-3 may extend in the second direction DR2, which crosses the first direction DR1. The second sensing coils CF1-1, CF1-2, CF1-3, CF2-1, CF2-2, and CF2-3 may be spaced apart from the first sensing coils RF1-1, RF1-2, RF1-3, RF2-1, RF2-2, and RF2-3 in a thickness direction of the photosensitive resin layer PI.

The first digitizer sensors RF1 and RF2 may correspond to input coils of the digitizer ZM of the EMR method, and the second digitizer sensors CF1 and CF2 may correspond to output coils of the digitizer ZM of the EMR method.

The first sensing coils RF1-1, RF1-2, RF1-3, RF2-1, RF2-2, and RF2-3 and the second sensing coils CF1-1, CF1-2, CF1-3, CF2-1, CF2-2, and CF2-3 may be arranged in the photosensitive resin layer PI to be insulated from each other. Each of the first sensing coils RF1-1, RF1-2, RF1-3, RF2-1, RF2-2, and RF2-3 may be connected to corresponding first digitizer pads TC1, and each of the second sensing coils CF1-1, CF1-2, CF1-3, CF2-1, CF2-2, and CF2-3 may be connected to corresponding second digitizer pads TC2.

The first sensing coils RF1-1, RF1-2, RF1-3, RF2-1, RF2-2, and RF2-3 may receive scan signals that are activated in different periods from one another. Each of the first sensing coils RF1-1, RF1-2, RF1-3, RF2-1, RF2-2, and RF2-3 may generate a magnetic field in response to a corresponding scan signal.

When the pen SP (refer to FIG. 1A) approaches the first sensing coils RF1-1, RF1-2, RF1-3, RF2-1, RF2-2, and RF2-3, the magnetic field induced by the first sensing coils RF1-1, RF1-2, RF1-3, RF2-1, RF2-2, and RF2-3 resonates with the resonant circuit of the pen SP. The pen SP may generate a resonant frequency. In an exemplary embodiment, the pen SP may include an LC resonant circuit including an inductor and a capacitor.

The second sensing coils CF1-1, CF1-2, CF1-3, CF2-1, CF2-2, and CF2-3 may output the sensing signals in accordance with the resonant frequency of the pen SP to the second digitizer pads TC2.

In the following description, a center portion of an area where a second coil RF2-2 among the first sensing coils RF1-1, RF1-2, RF1-3, RF2-1, RF2-2, and RF2-3 crosses a second coil CF2-2 among the second sensing coils CF1-1, CF1-2, CF1-3, CF2-1, CF2-2, and CF2-3 is assumed as an input point PP.

The sensing signal output from the second coil RF2-2 among the first sensing coils RF1-1, RF1-2, RF1-3, RF2-1, RF2-2, and RF2-3 may have a level higher than the sensing signals output from the other first sensing coils RF1-1, RF1-2, RF1-3, RF2-1, and RF2-3.

The sensing signal output from the second coil CF2-2 among the second sensing coils CF1-1, CF1-2, CF1-3, CF2-1, CF2-2, and CF2-3 may have a level higher than the sensing signals output from the other second sensing coils CF1-1, CF1-2, CF1-3, CF2-1, and CF2-3.

The sensing signals output from a first coil CF2-1 and a third coil CF2-3 among the second sensing coils CF1-1, CF1-2, CF1-3, CF2-1, CF2-2, and CF2-3 may have a level lower than that of the sensing signal output from the second coil CF2-2, and the sensing signals output from the first coil CF2-1 and the third coil CF2-3 among the second sensing coils CF1-1, CF1-2, CF1-3, CF2-1, CF2-2, and CF2-3 may have a level higher than that of the sensing signals output from the other second sensing coils CF1-1, CF1-2, and CF1-3.

Two-dimensional coordinate information of the input point PP by the pen SP may be calculated based on a time when the sensing signal output from the second coil CF2-2 and having the high level is detected and a relative position of the second coil CF2-2 with respect to the second sensing coils CF1-1, CF1-2, CF1-3, CF2-1, and CF2-3.

Referring to FIGS. 6A and 6B, the digitizer ZM according to an exemplary embodiment may include the first surface ZM-U (front surface) and the second surface ZM-B (bottom or rear surface). The first surface ZM-U may be disposed to be more adjacent to the display module DM than the second surface ZM-B is.

In an exemplary embodiment, the first surface ZM-U may be relatively flat compared with the second surface ZM-B. For example, the first surface ZM-U may be more flat than the second surface ZM-B. For example, the roughness of the first surface ZM-U may be different from the roughness of the second surface ZM-B, as described further below (e.g., the first surface ZM-U may be less rough than the second surface ZM-B). The roughness of the first surface ZM-U may correspond to the first surface ZM-U being substantially flat (i.e., within a measurement error as understood by a person having ordinary skill in the art).

FIG. 6B is an enlarged view showing an area of the digitizer ZM. FIG. 6B may correspond to a cross-sectional view taken along line I-I' of FIG. 5. In an exemplary embodiment, when the digitizer ZM is formed, the first surface ZM-U may be a surface disposed on a base substrate on which a process is performed. In addition, the second surface ZM-B may be a surface formed by forming the sensing coils RF1 and RF2 on the photosensitive resin layer PI and curing the photosensitive resin layer PI.

For example, the photosensitive resin layer PI may be formed by forming the first sensing coils RF1-1, RF1-2, and RF1-3, firstly curing the photosensitive resin layer PI, forming the second sensing coils CF1-1, CF1-2, and CF1-3 on the photosensitive resin layer PI that is firstly cured, and then secondly curing the photosensitive resin layer PI. Secondly curing the photosensitive resin layer PI may refer to curing the photosensitive resin layer PI at a point in time after the photosensitive resin layer PI is firstly cured.

In this case, the second surface ZM-B of the photosensitive resin layer PI may have an irregular surface due to a thickness of the sensing coils RF1-1, RF1-2, and RF1-3 disposed in the photosensitive resin layer PI when compared with the first surface ZM-U. Therefore, the first surface ZM-U may be relatively flat compared with the second surface ZM-B.

Accordingly, the first surface ZM-U may have relatively little interference by the sensing coils RF1 and RF2 when compared with the second surface ZM-B which is formed by forming the sensing coils RF1 and RF2 and being cured.

In an exemplary embodiment, the surface roughness of the first surface ZM-U may be smaller than that of the second surface ZM-B (e.g., the first surface ZM-U may be less rough, that is, more flat, compared to the second surface ZM-B). For example, the surface roughness of the first surface ZM-U may be equal to or greater than about 1 micrometer and equal to or smaller than about 10 micrometers, and the surface roughness of the second surface ZM-B may be relatively greater than the roughness of the first surface ZM-U and may be equal to or greater than about 5 micrometers and equal to or smaller than about 15 micrometers.

Herein, when a surface roughness is described as being equal to or greater than about a first value and equal to or smaller than about a second value, the surface roughness may also be described as being between the first value and the second value (inclusive of the first value and the second value).

The roughness (including the surface roughness described below) may be measured by certain equipment. For example, a range of the roughness described in the present disclosure may be a value measured by using a VK-X200 laser scanning microscope by KEYENCE Corporation.

The first surface ZM-U of the digitizer ZM may be coupled to a lower portion of the protective member PM by an adhesive layer AL. According to the present disclosure, as the first surface ZM-U, which has the relatively flat surface compared with the second surface ZM-B, is disposed more adjacent to the display module DM than the second surface ZM-B, the irregular surface may be prevented from being viewed by the user due to the light transmitting through the display module DM. Accordingly, the electronic apparatus may have improved visibility.

Figure 7:
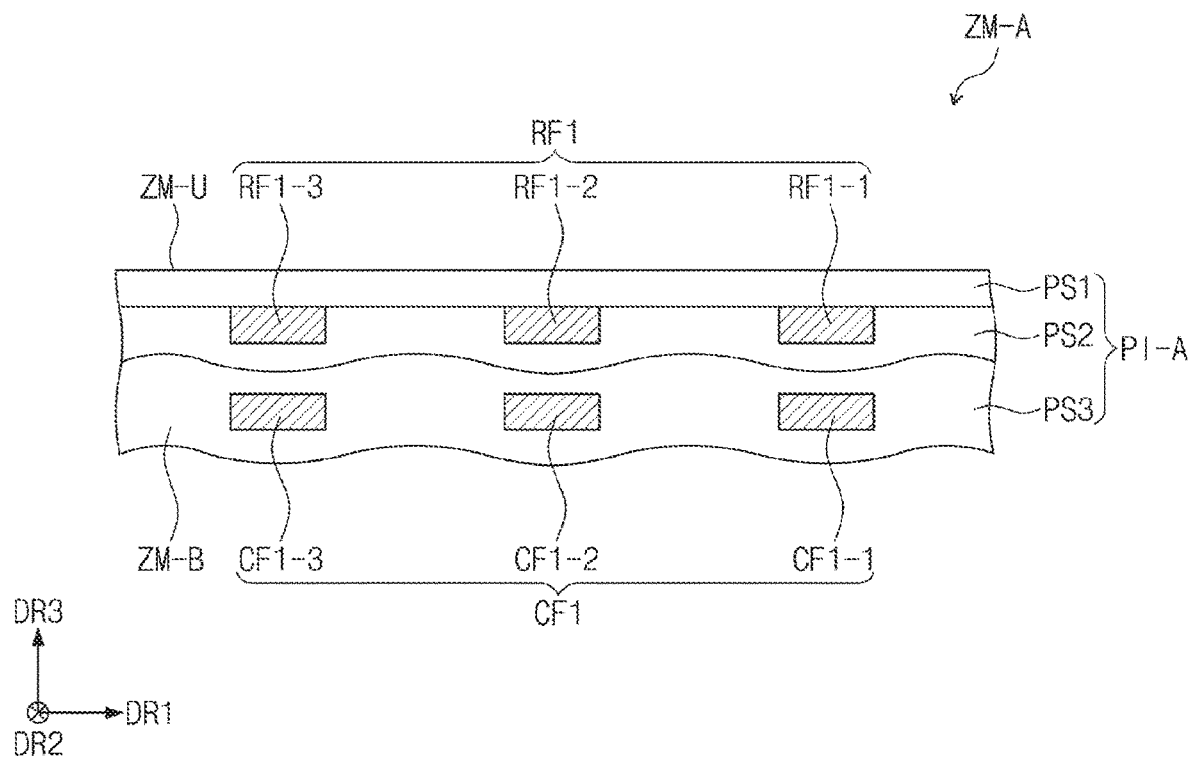
FIG. 7 is a cross-sectional view showing a digitizer according to an exemplary embodiment of the present disclosure.
Figure 8:
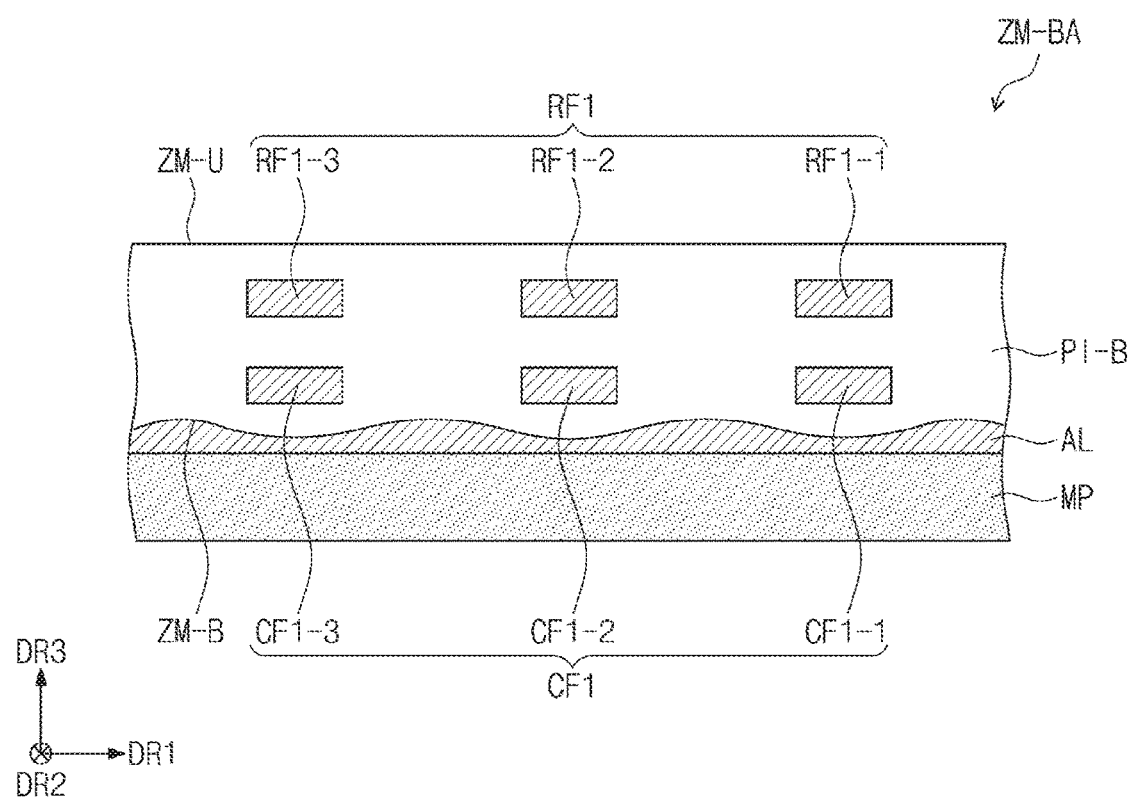
FIG. 8 is a cross-sectional view showing a digitizer according to an exemplary embodiment of the present disclosure.
Figure 9:
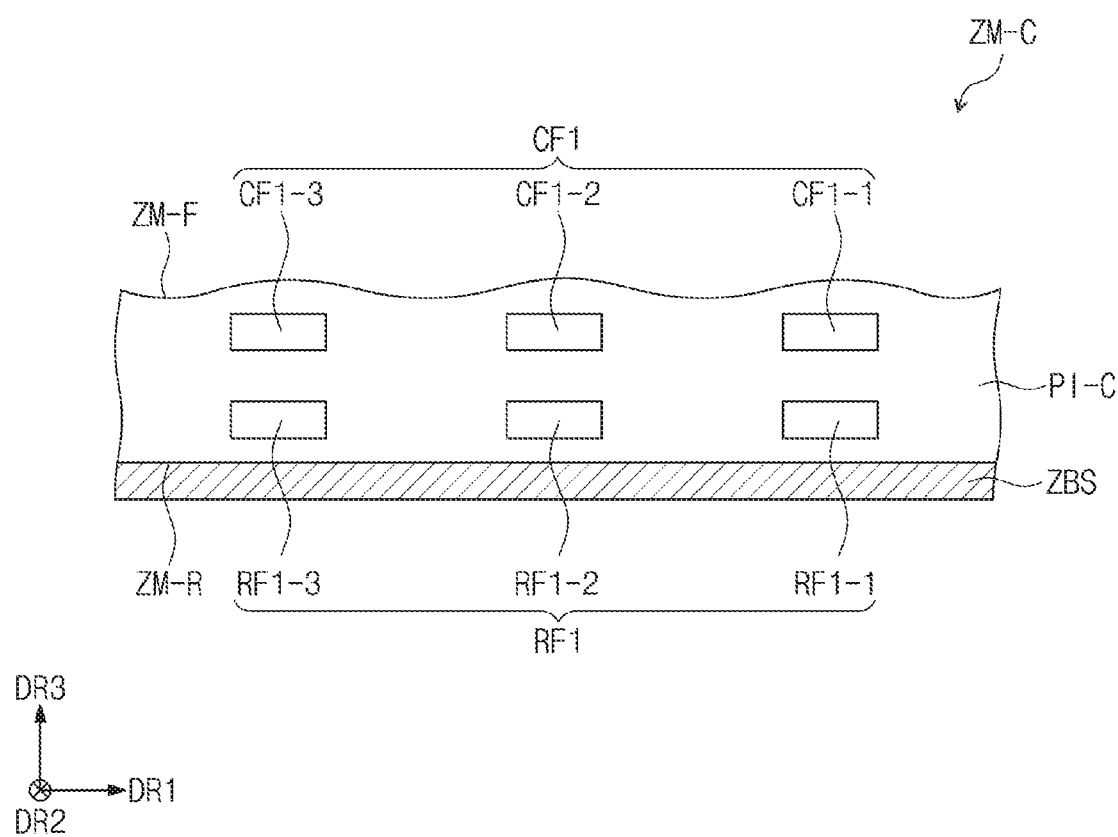
FIG. 9 is a cross-sectional view showing a digitizer according to an exemplary embodiment of the present disclosure.

FIG. 7 is a cross-sectional view showing a digitizer ZM-A according to an exemplary embodiment of the present disclosure. FIG. 8 is a cross-sectional view showing a digitizer ZM-BA according to an exemplary embodiment of the present disclosure. FIG. 9 is a cross-sectional view showing a digitizer ZM-C according to an exemplary embodiment of the present disclosure. In FIGS. 7 to 9, the same/similar reference numerals denote the same/similar elements in FIGS. 1A to 6B. Thus, for convenience of explanation, a further detailed description thereof will be omitted.

Referring to FIG. 7, the digitizer ZM-A may include a photosensitive resin layer PI-A and a plurality of sensing coils RF1 and CF1. The photosensitive resin layer PI-A of the digitizer ZM-A may include a plurality of resin layers PS1, PS2, and PS3.

The first resin layer PS1 may provide a first surface ZM-U of the digitizer ZM-A. First sensing coils RF1-1, RF1-2, and RF1-3 may be disposed on the first resin layer PS1.

A second resin layer PS2 may be disposed on the first resin layer PS1 and may cover the first sensing coils RF1-1, RF1-2, and RF1-3. Second sensing coils CF1-1, CF1-2, and CF1-3 may be disposed on the second resin layer PS2.

A third resin layer PS3 may provide a second surface ZM-B of the digitizer ZM-A. The third resin layer PS3 may cover the second sensing coils CF1-1, CF1-2, and CF1-3.

The photosensitive resin layer PI-A may include photosensitive polyimide. While the photosensitive resin layer PI of the digitizer ZM of FIG. 6B is formed to have an integral shape without being divided into layers even when cured a plurality of times, the photosensitive resin layer PI-A according to the exemplary embodiment of FIG. 7 may be divided into layers depending on properties of the photosensitive polyimide when being cured.

The first surface ZM-U of the digitizer ZM-A may be relatively flat compared with the second surface ZM-B. The first surface ZM-U may be disposed more adjacent to the display module DM (refer to FIG. 6A) compared with the second surface ZM-B.

Referring to FIG. 8, the digitizer ZM-BA may include a photosensitive resin layer PI-B, a plurality of sensing coils RF1 and CF1, and may further include a shielding layer MP. The photosensitive resin layer PI-B and the shielding layer MP may be coupled to each other by an adhesive layer AL.

The shielding layer MP may be disposed on a relatively irregular surface among surfaces of the digitizer ZM-BA. For example, the shielding layer MP may be disposed on a second surface ZM-B. A first surface ZM-U may be disposed to be more adjacent to the display module DM (refer to FIG. 6A) than the second surface ZM-B is.

In an exemplary embodiment, the shielding layer MP may include a metal material. For example, the shielding layer MP may include a magnetic metal powder (MMP).

In an exemplary embodiment, a surface roughness of the first surface ZM-U may be equal to or greater than about 1 micrometer and equal to or smaller than about 10 micrometers, and a surface roughness of the second surface ZM-B may be relatively greater than the roughness of the first surface ZM-U and may be equal to or greater than about 5 micrometers and equal to or smaller than about 15 micrometers.

According to an exemplary embodiment, the shielding layer MP may prevent electrical interference from occurring between the digitizer ZM-BA and components disposed under the digitizer ZM-BA. Accordingly, the electronic apparatus may have improved reliability.

Referring to FIG. 9, the digitizer ZM-C according to an exemplary embodiment may include a photosensitive resin layer PI-C, a plurality of sensing coils RF1 and CF1, and a shielding layer ZBS. The digitizer ZM-C may include a second surface ZM-F disposed more adjacent to the display module DM than a first surface ZM-R facing the second surface ZM-F. The shielding layer ZBS may make contact directly with the first surface ZM-R.

In an exemplary embodiment, the second surface ZM-F may be disposed to be more adjacent to the display module DM (refer to FIG. 6A) than the first surface ZM-R is.

The shielding layer ZBS may be a portion of a base layer used as a base substrate during processes of forming the digitizer ZM-C. Accordingly, the shielding layer ZBS may be coupled to the photosensitive resin layer PI-C without providing the separate adhesive layer as shown in FIG. 8.

In an exemplary embodiment, the shielding layer ZBS may include a metal material. For example, the shielding layer ZBS may include a permalloy or an invar that is an alloy of nickel (Ni) and iron (Fe) and a stainless steel.

In an exemplary embodiment, a surface roughness of the second surface ZM-F may be equal to or greater than about 1 micrometer and equal to or smaller than about 10 micrometers, and a surface roughness of the first surface ZM-R may be equal to or greater than about 1 micrometer and equal to or smaller than about 3 micrometers.

According to an exemplary embodiment, the shielding layer ZBS may be coupled to the photosensitive resin layer PI-C even though a separate adhesive layer is not provided, and thus, a slim digitizer ZM-C may be provided.

FIGS. 10A to 10G are cross-sectional views showing a method of manufacturing an electronic apparatus according to an exemplary embodiment of the present disclosure. In FIGS. 10A to 10G, the same/similar reference numerals denote the same/similar elements in FIGS. 1A to 7. Thus, for convenience of explanation, a further detailed description thereof will be omitted.

Hereinafter, a manufacturing method of the electronic apparatus according to an exemplary embodiment of the present disclosure will be described with reference to FIGS. 10A to 10G.

Figure 10A:
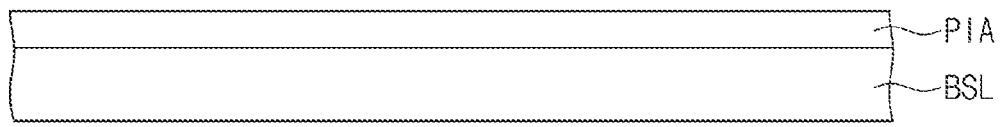
FIGS. 10A to 10G are cross-sectional views showing a method of manufacturing an electronic apparatus according to an exemplary embodiment of the present disclosure.

Referring to FIG. 10A, a base substrate BSL on which the processes are performed may be provided, and a first photosensitive resin layer PIA may be formed on the base substrate BSL. The first photosensitive resin layer PIA may include the photosensitive polyimide.

Figure 10B:
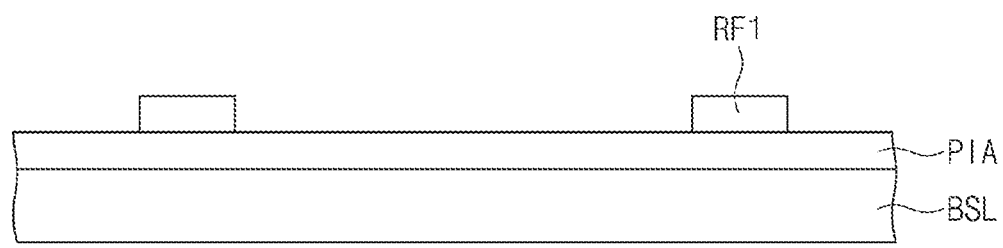

Referring to FIG. 10B, the first sensing coil RF1 may be formed on the first photosensitive resin layer PIA. The first sensing coil RF1 may be formed by coating a conductive material on the first photosensitive resin layer PIA and patterning the conductive material.

Figure 10C:
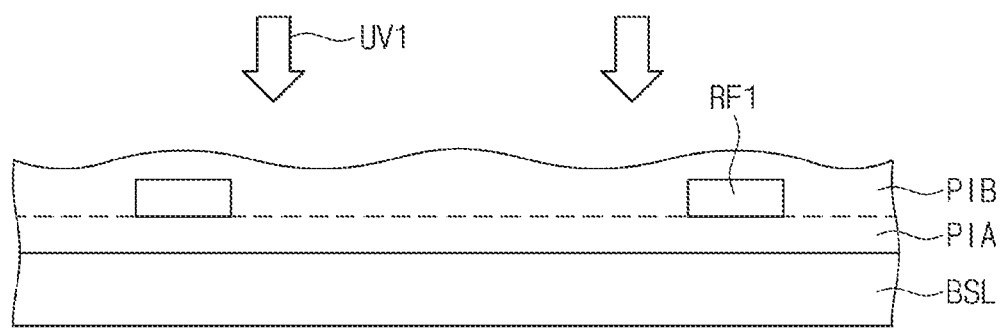

Then, referring to FIG. 10C, a second photosensitive resin layer PIB may be formed on the first photosensitive resin layer PIA. The second photosensitive resin layer PIB coated on the first photosensitive resin layer PIA may have concave-convex portions due to a step difference between an area where the first sensing coil RF1 is disposed and an area where the first sensing coil RF1 is not disposed. A first curing process UV1 may be performed after the second photosensitive resin layer PIB is coated.

A boundary between the first photosensitive resin layer PIA and the second photosensitive resin layer PIB having the same material as the first photosensitive resin layer PIA may not be viewed during the first curing process UV1. In FIG. 10C, for convenience of explanation, the boundary between the first photosensitive resin layer PIA and the second photosensitive resin layer PIB is shown by a dotted line.

Figure 10D:
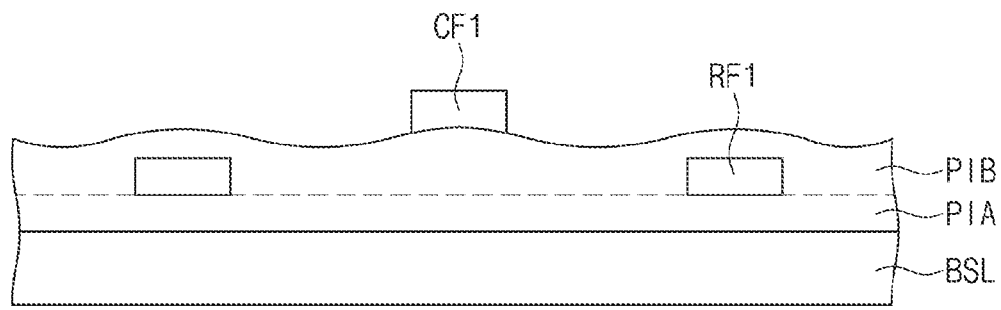

Referring to FIG. 10D, the second sensing coil CF1 may be formed on the second photosensitive resin layer PIB. The second sensing coil CF1 may be formed to be spaced apart from the first sensing coil RF1. The second sensing coil CF1 may be formed by coating a conductive material on the second photosensitive resin layer PIB and patterning the conductive material.

Figure 10E:
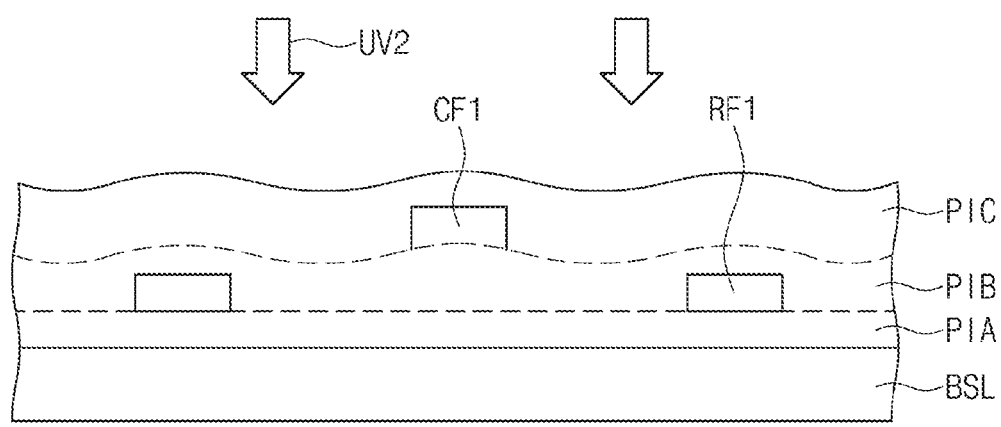

Referring to FIG. 10E, a third photosensitive resin layer PIC may be formed on the second photosensitive resin layer PIB. The third photosensitive resin layer PIC coated on the second photosensitive resin layer PIB may have concave-convex portions due to a step difference between an area where the first sensing coil RF1 and the second sensing coil CF1 are disposed and an area where the first sensing coil RF1 and the second sensing coil CF1 are not disposed. A second curing process UV2 may be performed after the third photosensitive resin layer PIC is coated.

A boundary between the second photosensitive resin layer PIB and the third photosensitive resin layer PIC having the same material as the first photosensitive resin layer PIA may not be viewed during the second curing process UV2. In FIG. 10E, for convenience of explanation, the boundaries between the first photosensitive resin layer PIA, the second photosensitive resin layer PIB, and the third photosensitive resin layer PIC are each shown by a dotted line.

Figure 10F:
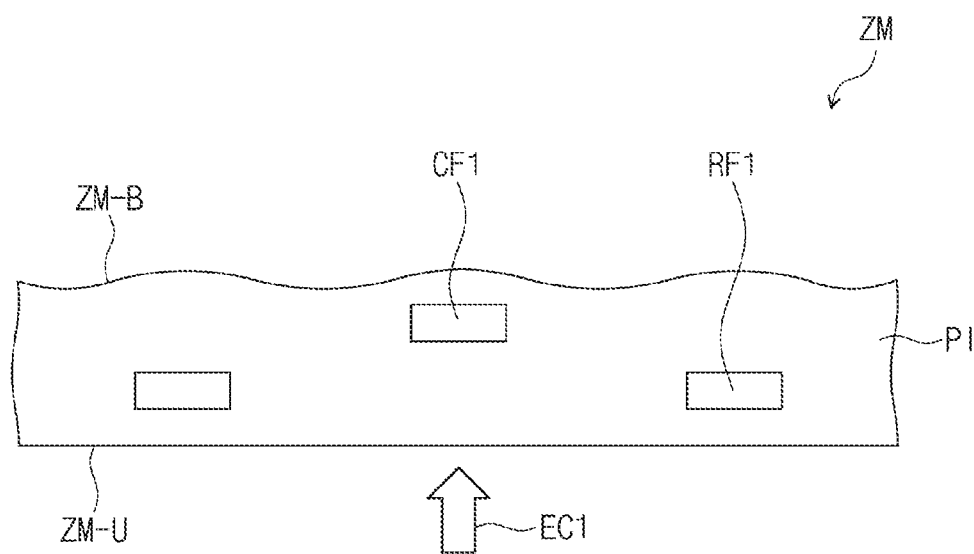

Referring to FIG. 10F, a first etching process EC1 may be performed on the base substrate BSL after the second curing process to remove all of the base substrate BSL. Accordingly, the first surface ZM-U that is exposed after removing all of the base substrate BSL and the second surface ZM-B that faces the first surface ZM-U and is more irregular than the first surface ZM-U may be formed in the digitizer ZM. The first to third photosensitive resin layers PIA, PIB, and PIC may be collectively referred to as the photosensitive resin layer PI. As can be seen in FIGS. 10A to 10F, the first photosensitive resin layer PIA corresponds to the first surface ZM-U and the third photosensitive resin layer PIC corresponds to the second surface ZM-B.

According to an exemplary embodiment, the base substrate BSL may include one of a metal material and a glass material. When the base substrate BSL includes the metal material, the base substrate BSL may be removed from the first photosensitive resin layer PIA by a chemical method. For example, the base substrate BSL may be removed from the first photosensitive resin layer PIA by applying a solution containing acid to the base substrate BSL.

When the base substrate BSL includes the glass material, the base substrate BSL may be removed from the first photosensitive resin layer PIA by a physical method. For example, the base substrate BSL may be removed from the first photosensitive resin layer PIA by irradiating a laser beam to the base substrate BSL.

In this case, either an "Xe Excimer Laser" or a "Solid State Laser" may be used as laser irradiation equipment to remove the base substrate BSL. When the ultraviolet light from about 300 μm to about 400 μm is irradiated by the laser irradiation equipment, an adhesive force between the first photosensitive resin layer PIA and the base substrate BSL may become weak, and then the base substrate BSL may be removed from the first photosensitive resin layer PIA. According to an exemplary embodiment, the time required to remove the base substrate BSL from the first photosensitive resin layer PIA may be reduced more when the base substrate BSL is removed by the physical method than when the base substrate BSL is removed by the chemical method.

Figure 10G:
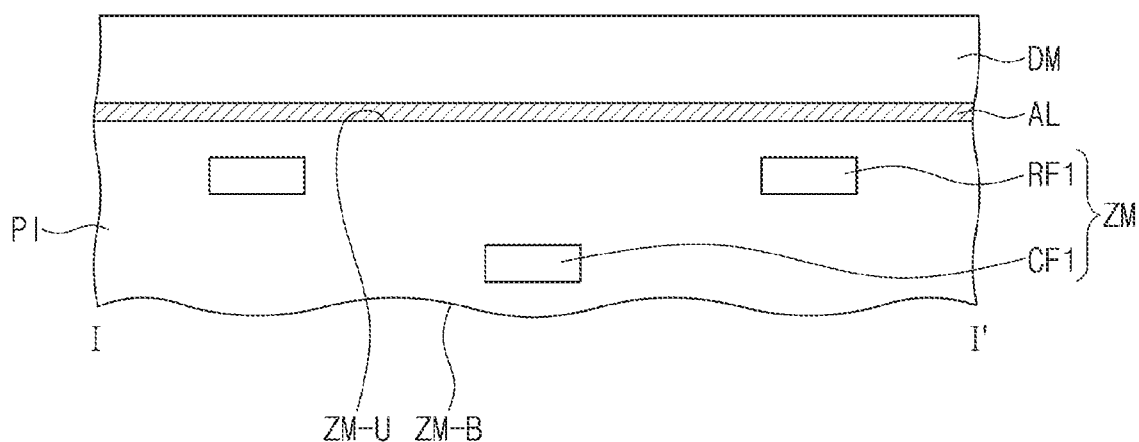

Then, referring to FIG. 10G, the manufacturing method of the electronic apparatus may include combining the digitizer ZM with the display module DM. The digitizer ZM and the display module DM may be combined with each other by the adhesive layer AL. FIG. 10G may correspond to a cross-sectional view taken along line I-I' of FIG. 5.

According to an exemplary embodiment, as the first surface ZM-U, which has a relatively flat surface when compared with the second surface ZM-B, is disposed more adjacent to the display module DM than the second surface ZM-B, the concave-convex portions (e.g., the rough portions) of the second surface ZM-B are not visible to the user. Accordingly, the viewing characteristics of the electronic apparatus may be improved.

Figure 11A:
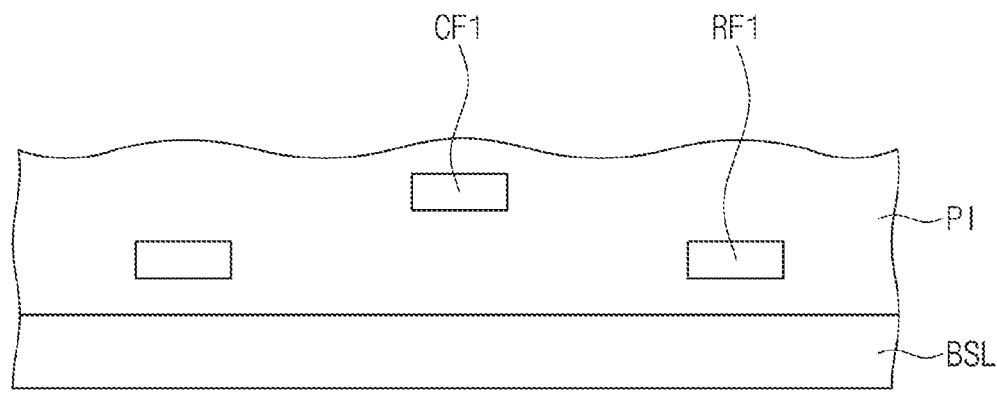
FIGS. 11A to 11C are cross-sectional views showing a method of manufacturing an electronic apparatus according to an exemplary embodiment of the present disclosure.
Figure 11B:
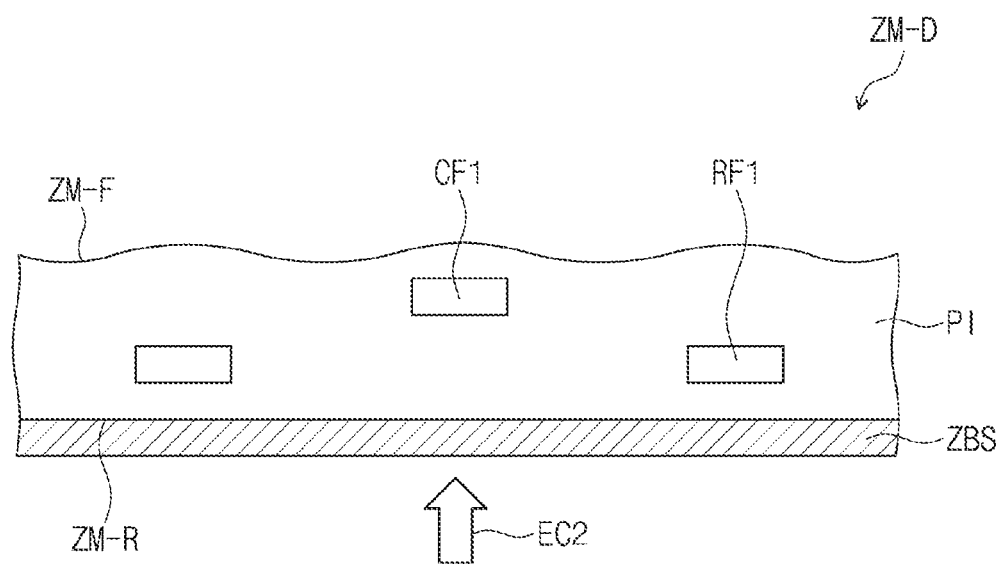
Figure 11C:
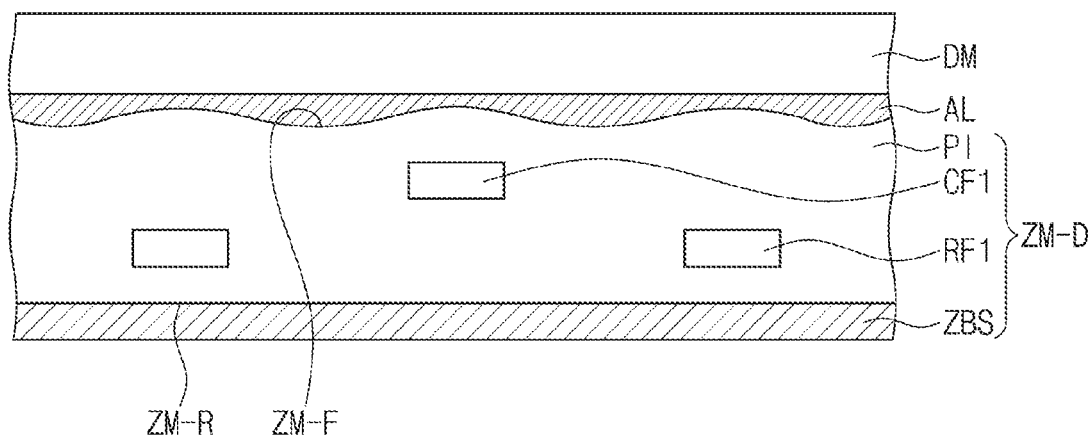

FIGS. 11A to 11C are cross-sectional views showing a method of manufacturing an electronic apparatus according to an exemplary embodiment of the present disclosure. In FIGS. 11A to 11C, the same/similar reference numerals denote the same/similar elements in FIGS. 1A to 10G. Thus, for convenience of explanation, a further detailed description thereof will be omitted.

FIG. 11A shows the same state as a state after the third photosensitive resin layer PIC is secondly cured in the manufacturing processes of the electronic apparatus of FIG. 10E. According to an exemplary embodiment, the base substrate BSL may include a metal material. For example, the base substrate BSL may include one of a permalloy, an invar, and a stainless steel.

Then, referring to FIG. 11B, a second etching process EC2 may be performed to remove a portion of the base substrate BSL. The removing of the portion of the base substrate BSL may be performed in a thickness direction of the base substrate BSL. After the portion of the base substrate BSL is removed, a residual portion of the base substrate may serve as the shielding layer ZBS.

According to an exemplary embodiment, a surface of the photosensitive resin layer PI, which makes contact with the shielding layer ZBS, may be defined as the first surface ZM-R, and a surface opposite to the first surface ZM-R may be defined as the second surface ZM-F. In an exemplary embodiment, the shielding layer ZBS may be formed to make contact (e.g., direct contact) with the first surface ZM-R.

Then, referring to FIG. 11C, the manufacturing method of the electronic apparatus may include combining a digitizer ZM-D with the display module DM. The digitizer ZM-D and the display module DM may be combined with each other by the adhesive layer AL.

According to an exemplary embodiment, the portion of the base substrate BSL used as a work substrate may be removed, and the residual portion of the base substrate may be used as the shielding layer ZBS. Accordingly, the digitizer ZM-D integrally provided with the shielding layer may be formed without using a separate shielding layer and a separate adhesive layer. Thus, a manufacturing cost of the digitizer ZM-D may be reduced, and the digitizer ZM-D having a slim size may be implemented.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. An electronic apparatus, comprising:
   a window;
   a display panel disposed under the window; and
   a digitizer disposed under the display panel, the digitizer comprising:
     a photosensitive resin layer comprising a first surface and a second surface opposite to the first surface; and
     a plurality of sensing coils embedded within the photosensitive resin layer,
   wherein the first surface is relatively flat compared with the second surface.

2. The electronic apparatus of claim 1, wherein the first surface is disposed more adjacent to the display panel than the second surface is, a surface roughness of the first surface is smaller than a surface roughness of the second surface, and the surface roughness of the first surface is equal to or greater than about 1 micrometer and equal to or smaller than about 10 micrometers.

3. The electronic apparatus of claim 2, wherein the surface roughness of the second surface is equal to or greater than about 5 micrometers and equal to or smaller than about 15 micrometers.

4. The electronic apparatus of claim 2, wherein the digitizer further comprises:
   a shielding layer disposed on the second surface; and
   an adhesive layer attaching the shielding layer to the second surface,
   wherein the shielding layer comprises a magnetic metal powder.

5. The electronic apparatus of claim 1, wherein the second surface is disposed more adjacent to the display panel than the first surface; and
   a surface roughness of the first surface is smaller than a surface roughness of the second surface, and the surface roughness of the second surface is equal to or greater than about 1 micrometer and equal to or smaller than about 10 micrometers.

6. The electronic apparatus of claim 5, wherein the surface roughness of the first surface is equal to or greater than about 1 micrometer and equal to or smaller than about 3 micrometers.

7. The electronic apparatus of claim 5, wherein the digitizer further comprises a shielding layer making contact with the first surface, and the shielding layer comprises one of a permalloy, an invar, and a stainless steel.

8. The electronic apparatus of claim 1, wherein the plurality of sensing coils comprises:
   a first sensing coil extending in a first direction; and
   a second sensing coil extending in a second direction crossing the first direction, and spaced apart from the first sensing coil in a thickness direction of the photosensitive resin layer.

9. The electronic apparatus of claim 8, wherein the photosensitive resin layer comprises:
   a first photosensitive resin layer,
   wherein the first sensing coil is disposed on the first photosensitive resin layer and the first photosensitive resin layer corresponds to the first surface;
   a second photosensitive resin layer covering the first sensing coil,
   wherein the second sensing coil is disposed on the second photosensitive resin layer; and
   a third photosensitive resin layer covering the second sensing coil and corresponding to the second surface.

10. The electronic apparatus of claim 1, further comprising:
    at least one of a lower film and a cushion layer disposed under the display panel.

11. The electronic apparatus of claim 10, wherein the digitizer is disposed at a lowermost position among the display panel, the lower film, and the cushion layer, is disposed between the display panel and the lower film, is disposed between the lower film and the cushion layer, or is disposed between the display panel and the cushion layer.

12. The electronic apparatus of claim 1, further comprising:
    at least one of a sensing sensor disposed on the display panel which senses an external input using either self-capacitance or mutual capacitance, and an optical member disposed between the window and the display panel.

13. The electronic apparatus of claim 1, wherein the electronic apparatus comprises:
    a folding area that folds about a folding axis extending in one direction;
    a first non-folding area extending from a first side of the folding area; and
    a second non-folding area extending from a second side of the folding area.

14. The electronic apparatus of claim 1, wherein the photosensitive resin layer comprises a photosensitive polyimide.

15. An electronic apparatus, comprising:
    a window;
    a display panel disposed under the window; and
    a digitizer disposed under the display panel, the digitizer comprising:
      a photosensitive resin layer comprising a front surface and a rear surface opposite to the front surface; and
      a plurality of sensing coils embedded within the photosensitive resin layer,
    wherein a surface roughness of the front surface is equal to or greater than about 1 micrometer and equal to or smaller than about 10 micrometers.

16. The electronic apparatus of claim 15, wherein a surface roughness of the rear surface is greater than the surface roughness of the front surface, and the surface roughness of the rear surface is equal to or greater than about 5 micrometers and equal to or smaller than about 15 micrometers.

17. The electronic apparatus of claim 16, wherein the digitizer further comprises:

a shielding layer disposed on the rear surface; and
an adhesive layer attaching the shielding layer to the rear surface,
wherein the shielding layer comprises a magnetic metal powder.

18. The electronic apparatus of claim 15, wherein a surface roughness of the rear surface is smaller than the surface roughness of the front surface,
the digitizer further comprises a shielding layer disposed on the front surface, and
the shielding layer comprises one of a permalloy, an invar, and a stainless steel.

19. The electronic apparatus of claim 15, wherein the plurality of sensing coils comprises:
a first sensing coil extending in a first direction; and
a second sensing coil extending in a second direction crossing the first direction, and spaced apart from the first sensing coil in a thickness direction of the photosensitive resin layer.

20. The electronic apparatus of claim 19, wherein the photosensitive resin layer comprises:
a first photosensitive resin layer,
wherein the first sensing coil is disposed on the first photosensitive resin layer and the first photosensitive resin layer corresponds to the front surface;
a second photosensitive resin layer covering the first sensing coil,
wherein the second sensing coil is disposed on the second photosensitive resin layer; and
a third photosensitive resin layer covering the second sensing coil and corresponding to the rear surface.

21. The electronic apparatus of claim 15, further comprising:
at least one of a lower film and a cushion layer disposed under the display panel.

22. The electronic apparatus of claim 21, wherein the digitizer is disposed between the display panel and the lower film, is disposed between the display panel and the cushion layer, is disposed between the lower film and the cushion layer, or is disposed under one of the display panel, the lower film, and the cushion layer.

23. An electronic apparatus, comprising:
a window;
a display panel disposed under the window; and
a digitizer disposed under the display panel and comprising a first surface and a second surface opposite to the first surface, the digitizer comprising:
a first photosensitive resin layer corresponding to the first surface of the digitizer;
a first sensing coil disposed on the first photosensitive resin layer;
a second photosensitive resin layer covering the first sensing coil;
a second sensing coil disposed on the second photosensitive resin layer; and
a third photosensitive resin layer covering the second sensing coil and corresponding to the second surface of the digitizer,
wherein the first surface of the digitizer is relatively flat compared with the second surface of the digitizer.

24. The electronic apparatus of claim 23, wherein the first surface is disposed more adjacent to the display panel than the second surface is, and a surface roughness of the first surface is smaller than a surface roughness of the second surface.

25. The electronic apparatus of claim 24, wherein the surface roughness of the first surface is equal to or greater than about 1 micrometer and equal to or smaller than about 10 micrometers, and the surface roughness of the second surface is equal to or greater than about 5 micrometers and equal to or smaller than about 15 micrometers.

26. The electronic apparatus of claim 24, wherein the first photosensitive resin layer, the second photosensitive resin layer, and the third photosensitive resin layer comprise a photosensitive polyimide.

27. The electronic apparatus of claim 1, wherein the first surface is disposed more adjacent to the window than the second surface.

28. The electronic apparatus of claim 15, wherein the front surface is disposed more adjacent to the window than the second surface.

29. The electronic apparatus of claim 23, wherein the first surface is disposed more adjacent to the window than the second surface.

* * * * *